US008272942B2

(12) United States Patent
Tsukahara

(10) Patent No.: US 8,272,942 B2
(45) Date of Patent: Sep. 25, 2012

(54) GAMING MACHINE PERFORMING RENDERED EFFECT THAT ALLOWS SUSPENSE OF WINNING TO BE SUSTAINED ACCORDING TO SYMBOL COMBINATION REARRANGED UPON LOSING RESULT

(75) Inventor: Nakayasu Tsukahara, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 409 days.

(21) Appl. No.: 12/469,434

(22) Filed: May 20, 2009

(65) Prior Publication Data

US 2009/0298570 A1 Dec. 3, 2009

Related U.S. Application Data

(60) Provisional application No. 61/056,642, filed on May 28, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................... 463/20; 463/25; 463/30

(58) Field of Classification Search .................... 463/20, 463/25, 30

See application file for complete search history.

(56) References Cited

U.S. PATENT DOCUMENTS

| | | | | |
|---|---|---|---|---|
| 6,517,433 | B2 | 2/2003 | Loose et al. | |
| 2003/0027632 | A1 * | 2/2003 | Sines et al. | 463/29 |
| 2009/0280890 | A1 * | 11/2009 | Jaffe | 463/20 |

* cited by examiner

*Primary Examiner* — William M. Brewster

(74) *Attorney, Agent, or Firm* — Lexyoume IP Meister, PLLC

(57) ABSTRACT

A gaming machine 13 starts a game, determines symbols to be rearranged, and variably displays symbol groups. Next, in a case where at least a predetermined number of identical symbols for providing an award is rearranged or in a case where identical symbols for providing an award are rearranged in "REACH (ready-to-win)" state, the gaming machine 13 displays a rendered effect that corresponds to the identical symbol on a display device. Accordingly, in a case where a combination with a "REACH" state is achieved even if it ends up with a losing combination, a rendered effect, which is the same as that performed when a winning combination is achieved, is performed to allow the player to maintain the feeling of suspense for winning to the end.

7 Claims, 17 Drawing Sheets

FIG. 7

SYMBOL ARRANGEMENT TABLE

| SYMBOL POSITION | | | |
|---|---|---|---|
| | FIRST REEL | SECOND REEL | THIRD REEL |
| 20 | BONUS | BONUS | BONUS |
| 19 | MASK | Q | 10 |
| 18 | K | K | SNAKE |
| 17 | COMPASS | 10 | HOLY CUP |
| 16 | MASK | K | J |
| 15 | Q | TREASURE | TREASURE |
| 14 | HOLY CUP | HOLY CUP | WILD |
| 13 | J | J | Q |
| 12 | BONUS | BONUS | HOLY CUP |
| 11 | HOLY CUP | TREASURE | A |
| 10 | A | WILD | WILD |
| 9 | Q | COMPASS | A |
| 8 | WILD | A | 10 |
| 7 | A | 10 | TREASURE |
| 6 | J | J | MASK |
| 5 | K | HOLY CUP | 10 |
| 4 | TREASURE | TREASURE | TREASURE |
| 3 | A | WILD | K |
| 2 | HOLY CUP | TREASURE | COMPASS |
| 1 | TREASURE | K | TREASURE |
| 0 | Q | TREASURE | MASK |

FIG. 10

PAYOUT TABLE

| SYMBOL COMBINATION | AMOUNT OF COINS TO BE PAID OUT |
|---|---|
| BONUS | 100 |
| WILD | 60 |
| TREASURE | 50 |
| GOLDEN | 40 |
| HOLY CUP | 30 |

FIG. 11

RENDERED EFFECT DETERMINATION TABLE FOR WINNING COMBINATION

| RANDOM NUMBER VALUE | RENDERED EFFECT MODE |
|---|---|
| 0～99 | RENDERED EFFECT A |
| 100～189 | RENDERED EFFECT B |
| 190～239 | RENDERED EFFECT C |
| 240～255 | RENDERED EFFECT D |

FIG. 12

RENDERED EFFECT DETERMINATION TABLE FOR LOSING COMBINATION

| RANDOM NUMBER VALUE | RENDERED EFFECT MODE |
|---|---|
| 0～80 | RENDERED EFFECT a |
| 81～120 | RENDERED EFFECT b |
| 121～180 | RENDERED EFFECT c |
| 181～230 | RENDERED EFFECT d |
| 231～245 | RENDERED EFFECT e |
| 246～255 | RENDERED EFFECT f |

GAMING MACHINE PERFORMING RENDERED EFFECT THAT ALLOWS SUSPENSE OF WINNING TO BE SUSTAINED ACCORDING TO SYMBOL COMBINATION REARRANGED UPON LOSING RESULT

CROSS REFERENCE TO RELATED APPLICATIONS

This application claims benefit of U.S. Provisional Application No. 61/056,642, filed May 28, 2008, the entire contents of which are incorporated herein by reference.

BACKGROUND OF THE INVENTION

1. Field of the Invention

The present invention relates to a gaming machine which performs a rendered effect that enables the feeling of suspense for winning to be sustained according to a symbol combination rearranged upon a losing result.

2. Related Art

Conventionally, in slot machines, a game is started when a player bets a certain amount of credits. Then, a plurality of reels on which a plurality of symbols are depicted start to rotate, and are stopped after a predetermined time elapses. As a result, a certain award is provided to the player based on a symbol combination which is displayed statically. U.S. Pat. No. 6,517,433 discloses that, to improve a fault of lacking dynamic expressions on a display, a video display is disposed in front of rotational reels to provide a video image superimposed upon the rotational reels so as to associate images that provide rendered effects, including information regarding games with images of the reels each other, thereby producing novel and powerful effects in games.

However, in U.S. Pat. No. 6,517,433, regarding the rendered effects, there is no distinction between a case in which a player can sustain the feeling of suspense for winning to the end of the game upon a losing result and a case in which a player can find a combination to be a losing one right from the start. Therefore, if a certain rendered effect is performed for enabling the feeling of suspense for winning to be sustained while the player finds the combination to be a losing one right from the start, the player often feels dissatisfied.

The present invention provides a gaming machine with new entertainment properties, which performs rendered effects that enable the feeling of suspense for winning to be sustained according to a symbol combination rearranged upon a losing result.

SUMMARY OF THE INVENTION

In an aspect of the present invention, a gaming machine is provided, which includes a display device including a plurality of symbol display regions for displaying each of a plurality of symbol groups; an input device for starting a game; and a controller for executing the following processing of: (a) in response to an input to the input device, starting the game and determining symbols to be rearranged in the plurality of symbol display regions; (b) variably displaying each of the plurality of symbol groups in the plurality of symbol display regions; (c) among the symbols determined in the processing of (a), determining whether at least a predetermined number of identical symbol for providing an award is rearranged; (d) upon determining that at least a predetermined number of the identical symbol are rearranged in the processing of (c), displaying a rendered effect corresponding to the identical symbol on the display device; (e) upon determining that at least a predetermined number of the identical symbol are not rearranged in the processing of (c), determining whether the identical symbol is included in each of the symbol groups to be rearranged other than the symbol group to be rearranged last and not in the symbol group to be rearranged last, among a plurality of symbol groups to be rearranged; (f) upon determining that the identical symbol is included in each of a plurality of symbol groups to be rearranged other than the symbol group to be rearranged last in the processing of (e), displaying a rendered effect corresponding to the identical symbol on the display device; (g) rearranging each of the plurality of symbol groups in the plurality of symbol display regions; and (h) in a case where at least a predetermined number of the identical symbol is rearranged in the plurality of symbol display regions, providing an award corresponding to the identical symbol.

In another aspect of the present invention, a gaming machine is provided, in which the controller executes the following processing of: in the processing of (d), determining a single rendered effect image among a plurality of rendered effect images corresponding to the identical symbol and displaying the rendered effect image thus determined on the display device; and in the processing of (f), determining a single rendered effect image among a plurality of rendered effect images corresponding to the identical symbol, and displaying the rendered effect image thus determined on the display device.

In still another aspect of the present invention, a gaming machine is provided, which includes: a display device including a plurality of symbol display regions for displaying each of a plurality of symbol groups; an input device for starting a game; and a controller for executing the following processing of: (a) in response to an input to the input device, starting the game and determining symbols to be rearranged on a pay line set so as to pass through the plurality of symbol display regions; (b) variably displaying each of the plurality of symbol groups in the plurality of symbol display regions; (c) among the symbols determined in the processing of (a), determining whether a predetermined number of identical symbol for providing an award is rearranged on the pay line; (d) upon determining that the predetermined number of the identical symbol are rearranged in the processing of (c), displaying a rendered effect corresponding to the identical symbol on the display device; (e) upon determining that the predetermined number of the identical symbol are not rearranged in the processing of (c), determining whether a symbol rearranged on the pay line in the symbol group to be rearranged last is not the identical symbol and determining whether each of a plurality of symbols rearranged on the pay line in the symbol display groups to be rearranged other than the symbol group to be rearranged last are the identical symbol, among a plurality of symbol groups to be rearranged; (f) upon determining that each of a plurality of symbols rearranged on the pay line in the symbol display groups to be rearranged other than the symbol group to be rearranged last are the identical symbol in the processing of (e), displaying a rendered effect corresponding to the identical symbol on the display device; (g) rearranging each of the plurality of symbol groups in the plurality of symbol display regions; and (h) in a case where a predetermined number of the identical symbol is rearranged on the pay line, providing an award corresponding to the identical symbol.

In yet another aspect of the present invention, a gaming machine is provided in which the controller executes the following processing of: in the processing of (d), determining a single rendered effect image among a plurality of rendered effect images corresponding to the identical symbol and displaying the rendered effect image thus determined on the display device; and in the processing of (f), determining a single rendered effect image among a plurality of rendered effect images corresponding to the identical symbol, and displaying the rendered effect image thus determined on the display device.

BRIEF DESCRIPTION OF THE DRAWINGS

FIG. 7 is a diagram showing a symbol arrangement table according to an embodiment of the present invention;

FIG. 10 is a diagram showing a payout table according to an embodiment of the present invention;

FIG. 11 is a diagram showing a rendered effect determination table for winning combination according to an embodiment of the present invention;

FIG. 12 is a diagram showing a rendered effect determination table for losing combination according to an embodiment of the present invention;

DETAILED DESCRIPTION OF THE INVENTION

An embodiment of the present invention is described below with reference to the accompanying drawings.

Figure 1:
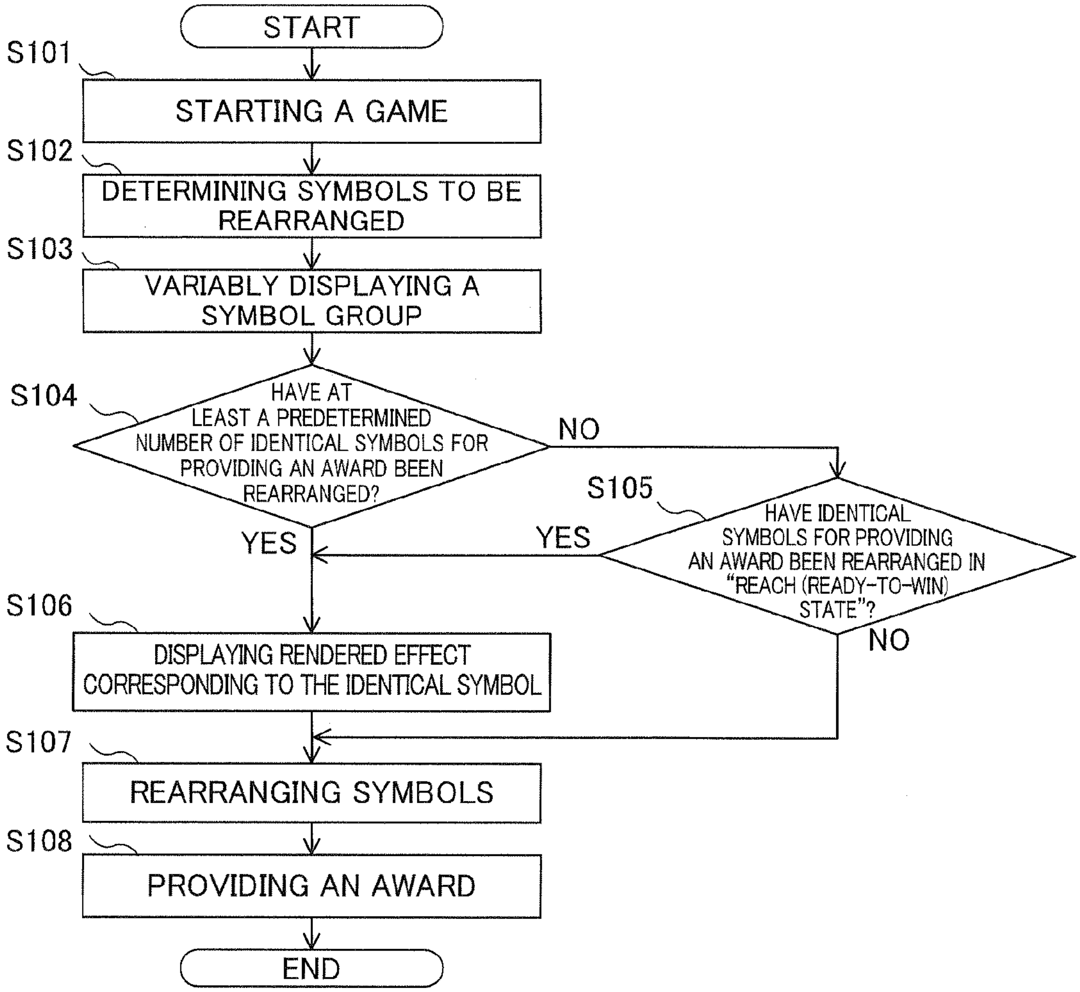
FIG. 1 is a flowchart showing processing in a game executed in a gaming machine according to an embodiment of the present invention.

As shown in FIG. 1, CPU 106 starts a game (Step S101), determines symbols to be rearranged (Step S102), and variably displays symbol groups (Step S103). Next, whether at least a predetermined number of identical symbols for providing an award have been rearranged (Step S104) is determined. In the case of a "YES" determination, the processing is advanced to Step S106. In the case of a "NO" determination, the processing is advanced to Step S105.

In Step S105, the CPU 106 determines whether identical symbols for providing an award are rearranged in a "REACH (ready-to-win)" state. In the case of a "YES" determination, the processing is advanced to Step S106. In the case of a "NO" determination, the processing is advanced to Step S107.

In Step S106, the CPU 106 displays a rendered effect image that corresponds to the identical symbols on a display device. Accordingly, in a case where a combination with a "REACH" state is achieved, even if it results in a losing combination, a rendered effect, which is the same as that performed when a winning combination is achieved, is performed to enable the feeling of suspense for winning to be maintained to the end.

In Step S107, the CPU 106 rearranges the symbols (Step S107), and provides an award corresponding to the identical symbols in a case where at least a predetermined number of identical symbols are rearranged (Step S108).

Figure 2:
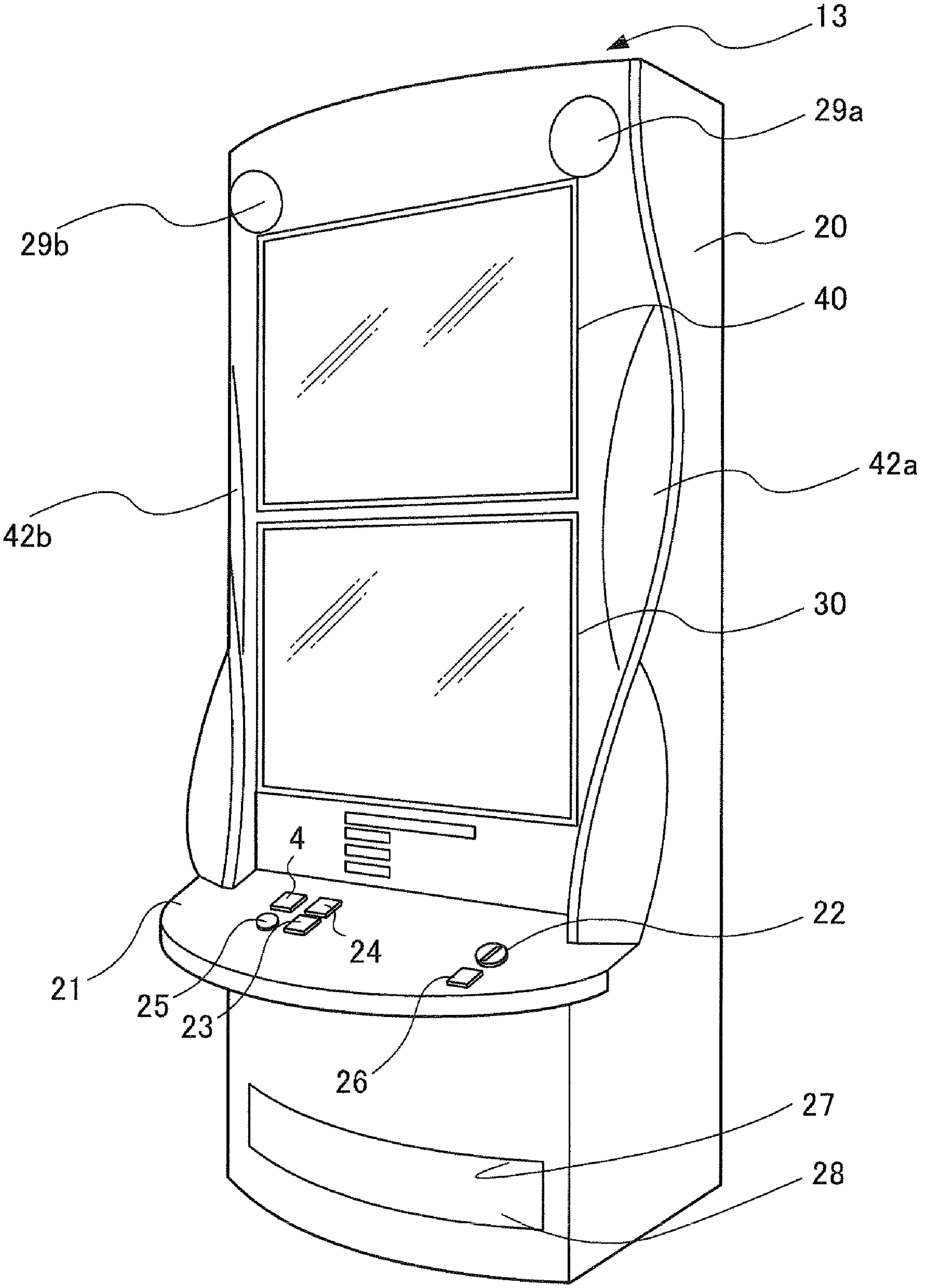
FIG. 2 is a perspective view showing the appearance of the gaming machine according to an embodiment of the present invention.

FIG. 2 is a perspective view showing the gaming machine 13 according to an embodiment of the present invention. The gaming machine 13 includes a cabinet 20. The cabinet 20 has a structure in which the face facing the player is open. The cabinet 20 contains various components including a game controller 100 (refer to FIG. 4) for electrically controlling the gaming machine 13, and a hopper 44 (refer to FIG. 4) for controlling the insertion, storage, and payout of coins (being one type of game media), and the like. The game media is not restricted to coins. In addition, examples of such game media include medals, tokens, electronic money or electronic value information (credits) having the same value.

The liquid crystal display 30 is installed substantially in the middle of the front face of the cabinet 20, and the liquid crystal display 40 is installed in upper side of the cabinet 20.

The liquid crystal display 30 realizes a display device for displaying a variety of images related to the game including rendered images and the like. Such a configuration allows the player to advance the game while visually confirming various kinds of images displayed on the aforementioned liquid crystal display 30. In such a game, the liquid crystal display 30 displays slot games shown in FIGS. 13 to 22 which are described later.

The gaming machine 13 includes video reels (a group of symbol images), and three virtual reels can be displayed on the liquid crystal display 30. It should be noted that the term "video reel" as used here represents a mechanism for displaying a reel on the liquid crystal display 30 in the form of an image.

The other liquid crystal display 40 above the liquid crystal display 30 is a display functioning as a sub display for displaying the rules of the game, demonstration screens, and the like.

Sound transmission openings 29*a* and 29*b*, through which sound effects emitted from a speaker 41 (refer to FIG. 4) contained inside the cabinet 20 are propagated outside the cabinet 20, are disposed on the upper right and left sides of the liquid crystal display 40, respectively. The sound transmission openings 29*a* and 29*b* generate sound effects and the like in accordance with the progress of the game. In addition, decorative lamps 42*a* and 42*b* are disposed on the right and left sides substantially in the middle of the gaming machine 13, respectively. The decorative lamps 42*a* and 42*b* emit light in accordance with the progress of the game.

The gaming machine 13 includes a substantially horizontal operation unit 21 below the liquid crystal display 30. Disposed on the right side of the operation unit 21 is a coin insertion slot 22 through which a number of coins are inserted into the gaming machine 13. On the other hand, the components provided to the left side of the operation unit 21 include: a bet switch 23 that allows the player to select the number of coins, which serves as a gaming medium to be bet; and a spin repeat bet switch 24 that allows the player to play another game without changing the number of coins bet in the previous game. Such an arrangement allows the player to set the number of coins to be bet by performing a pushing operation on either the bet switch 23 or the spin repeat bet switch 24.

In the operation unit 21, a start switch 25 for accepting per game the player's operation of starting a game is disposed on the left side of the bet switch 23. Upon performing a pushing operation on either the start switch 25 or the spin repeat bet switch 24, which serves as a trigger to start the game, the image that the aforementioned three video reels start to rotate is displayed.

A cash out switch 26 is provided near the coin insertion opening 22 on the operation unit 21. Upon the player pushing the cash out switch 26, the inserted coins are paid out from a coin payout opening 27 provided at a lower portion of the front face. The coins thus paid out are retained in a coin tray 28.

Figure 3:
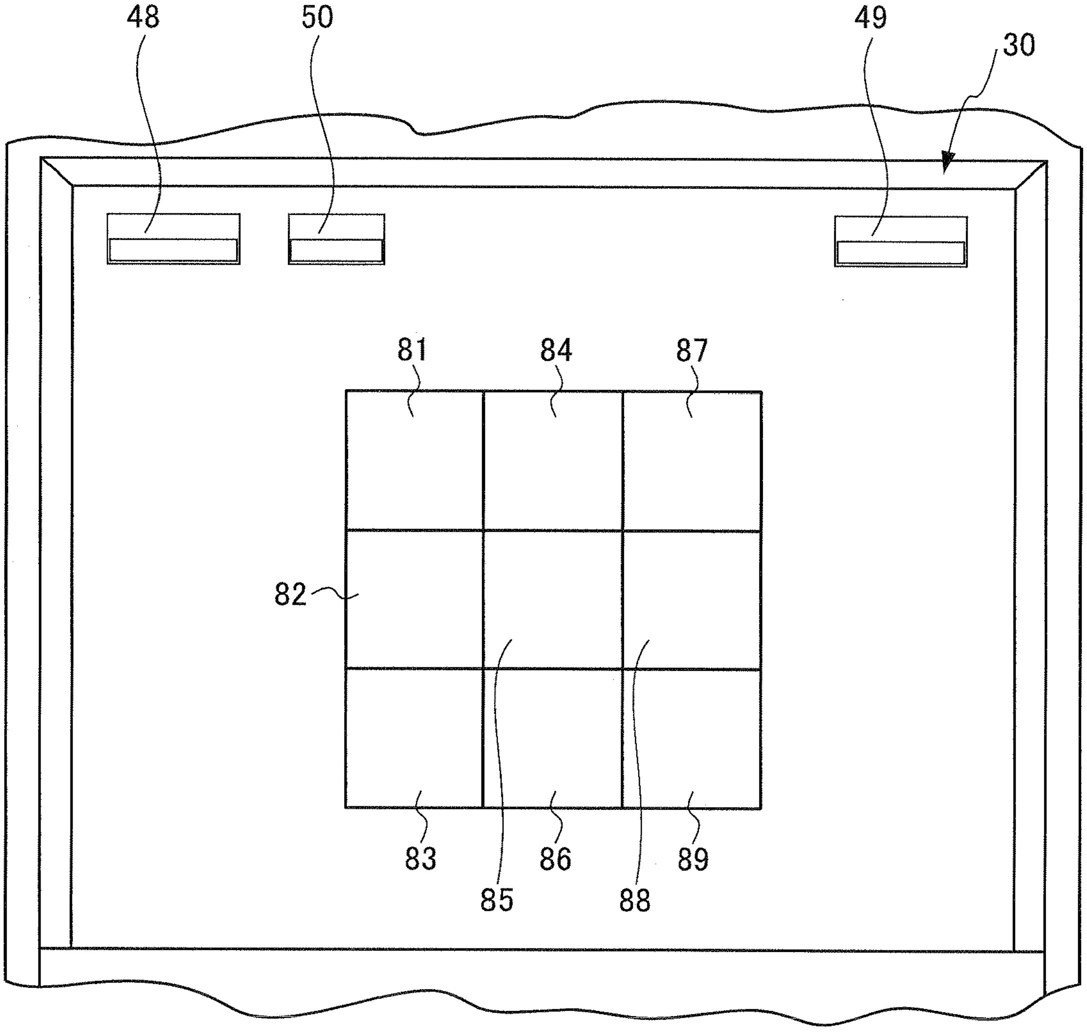
FIG. 3 is an enlarged front view showing a display region of the gaming machine according to an embodiment of the present invention.

FIG. 3 shows an enlargement of a display region of the gaming machine 13. As shown in FIG. 3, the gaming machine 13 has symbol display regions 81 to 89 arranged in a matrix of 3 rows by 3 columns. The symbol display regions are also called as symbol display blocks or symbol display location. Among the symbol display regions 81 to 89, the symbol display regions 81 to 83 correspond to a video reel 3A (described later), the symbol display regions 84 to 86 correspond to a video reel 3B (described later), and the symbol display regions 87 to 89 correspond to a video reel 3C (described later).

The game available in the present embodiment is a game in which an award is provided to a player corresponding to the number of identical symbols for providing an award rearranged at the symbol display regions 81 to 89. The number of identical symbols for providing an award can be defined arbitrarily such as three or more symbols, and the like.

It is arranged so that a payout number display portion 48, a bet number display portion 50, and a credit number display portion 49 can be displayed in this order from the left side on the upper portion of the liquid crystal display 30. The payout number display portion 48 is a component for displaying the amount of the coins paid out when no less than a predetermined number of identical symbols for providing an award are rearranged and displayed on the symbol display regions 81 to 89. The credit number display portion 49 displays the credit number of coins stored in the gaming machine 13. The bet amount display portion 50 is a component for displaying the bet amount, which is the number of coins bet.

Figure 4:
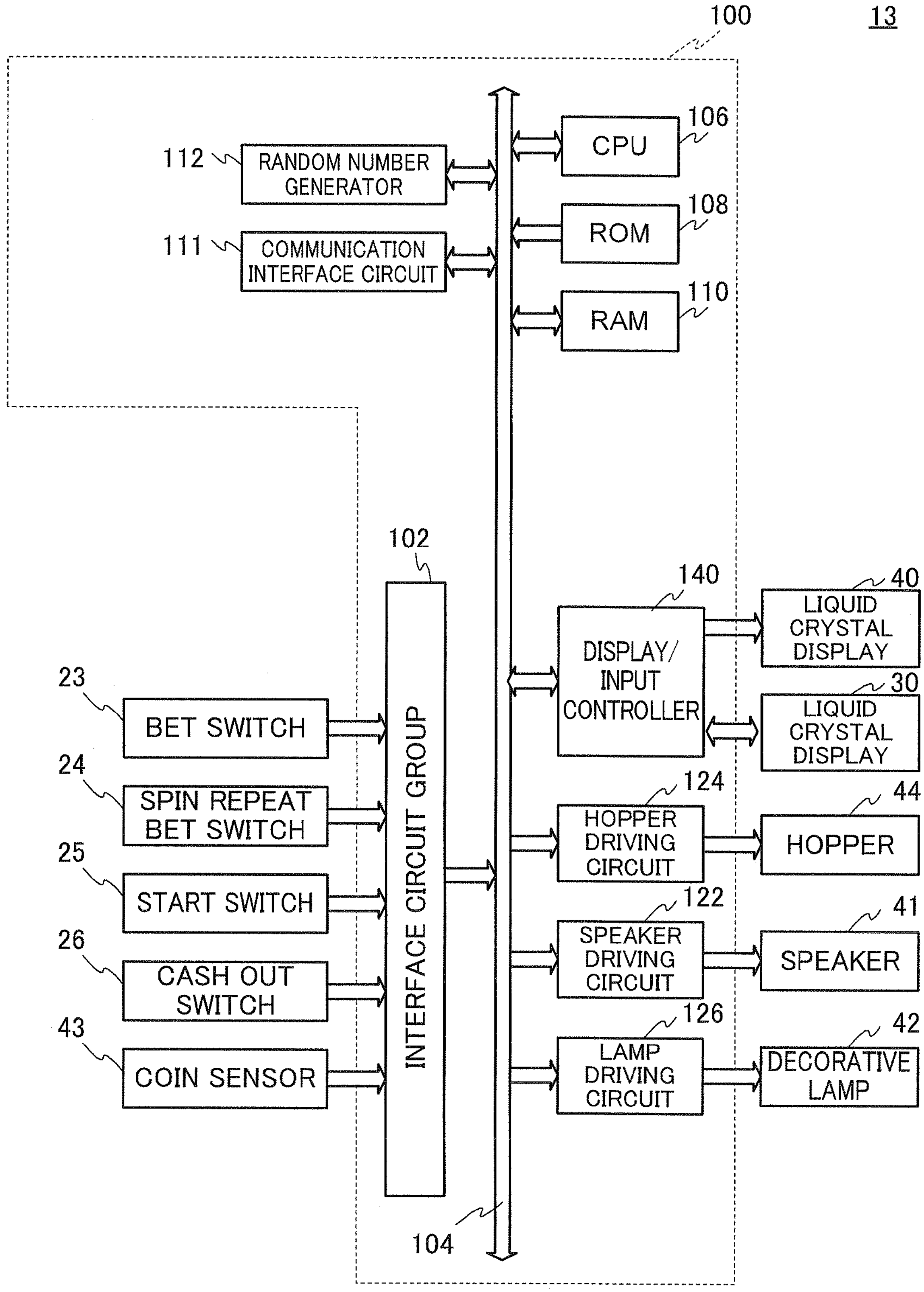
FIG. 4 is a block diagram of a controller of the gaming machine according to an embodiment of the present invention.

FIG. 4 is a block diagram showing the electrical configuration of the game controller 100 of the gaming machine 13. Referring to FIG. 4, the game controller 100 of the gaming machine 13 is a microcomputer and provided with an interface circuit group 102, an input/output bus 104, CPU 106, ROM 108, RAM 110, a communication interface circuit 111, a random number generator 112, a speaker driving circuit 122, a hopper driving circuit 124, a lamp driving circuit 126, and a display/input controller 140.

The interface circuit group 102 is electrically connected with the input/output bus 104, which carries out input and output of data signals or address signals for CPU 106.

The start switch 25 is electrically connected with the interface circuit group 102. In the interface circuit group 102, a start signal generated by the start switch 25 is converted into a predetermined form of signal to be supplied to the input/output bus 104.

Furthermore, the bet switch 23, the spin repeat bet switch 24, and the cash out switch 26 are connected to the interface circuit group 102. Each of the switching signals output from these switches 23, 24, and 26 is also supplied to the interface circuit group 102, and is converted into a predetermined signal by the interface circuit group 102. The switching signals thus converted are supplied to the input/output bus 104.

A coin sensor 43 is also electrically connected with the interface circuit group 102. The coin sensor 43 detects coins inserted into the coin insertion slot 22, and is disposed at an appropriate position relative to the coin insertion slot 22. The sensing signal output from the coin sensor 43 is also supplied to the interface circuit group 102, and is converted into a predetermined signal by the interface circuit group 102. The sensing signal thus converted is supplied to the input/output bus 104.

The ROM 108 and the RAM 110 are connected to the input/output bus 104.

Upon accepting the start operation of a game by way of the start switch 25, the CPU 106 reads a game program to execute the game. The game program is programmed so that a display for starting the scrolling of the symbols on the three video reels is performed on each of the symbol display regions 81 to 89 on the liquid crystal display 30 via the display/input controller 140. Thereafter, a display for stopping the three video reels is performed in the order of the video reels 3A, 3B, and 3C (described later) in order to rearrange the three video reels. In a case where no less than a predetermined number of identical symbols among all of the symbols which are stopped in each reel are rearranged, coins corresponding to the number of identical symbols rearranged are paid out.

Figure 8:
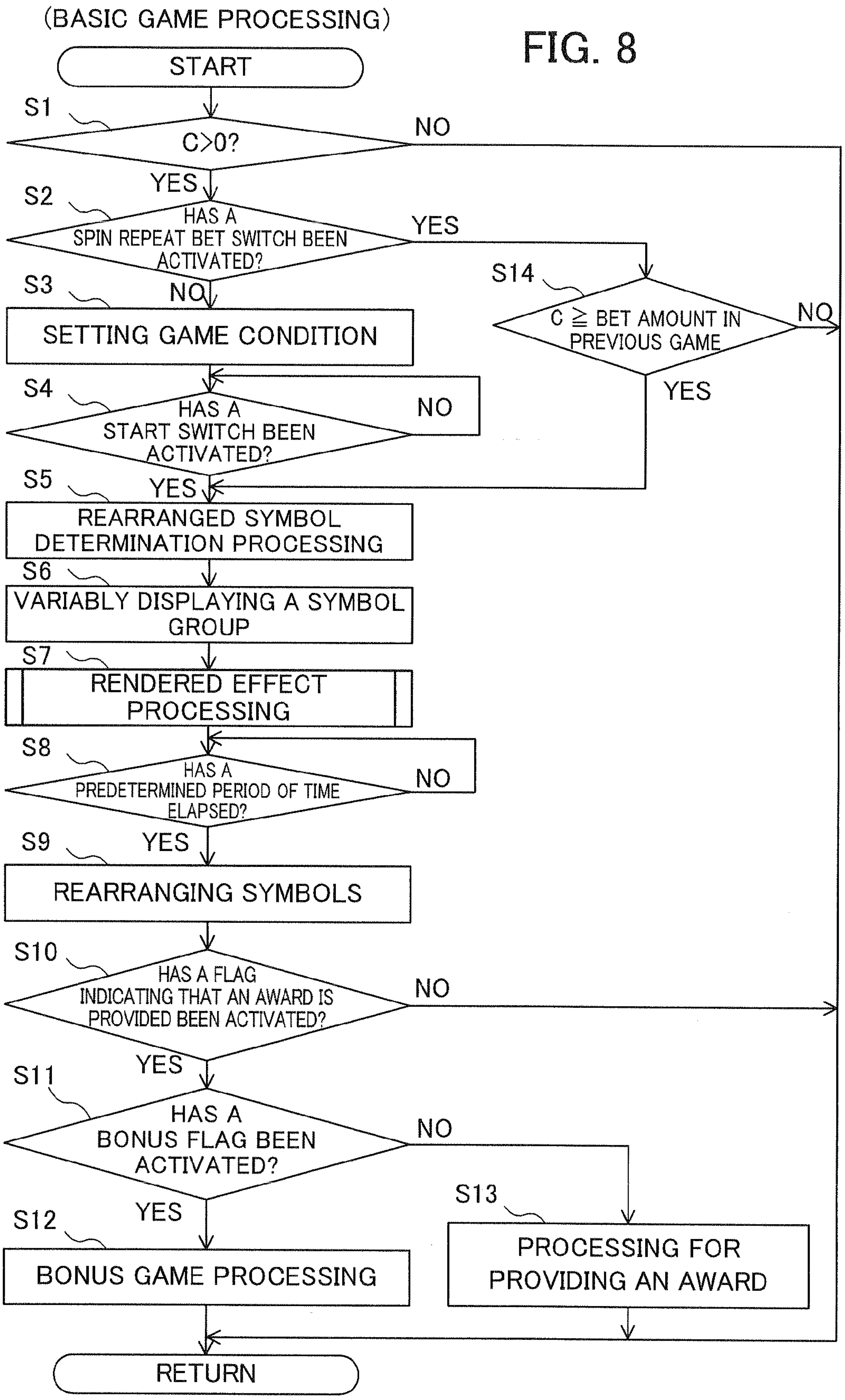
FIG. 8 is a flowchart showing basic game processing executed in the gaming machine according to an embodiment of the present invention.
Figure 9:
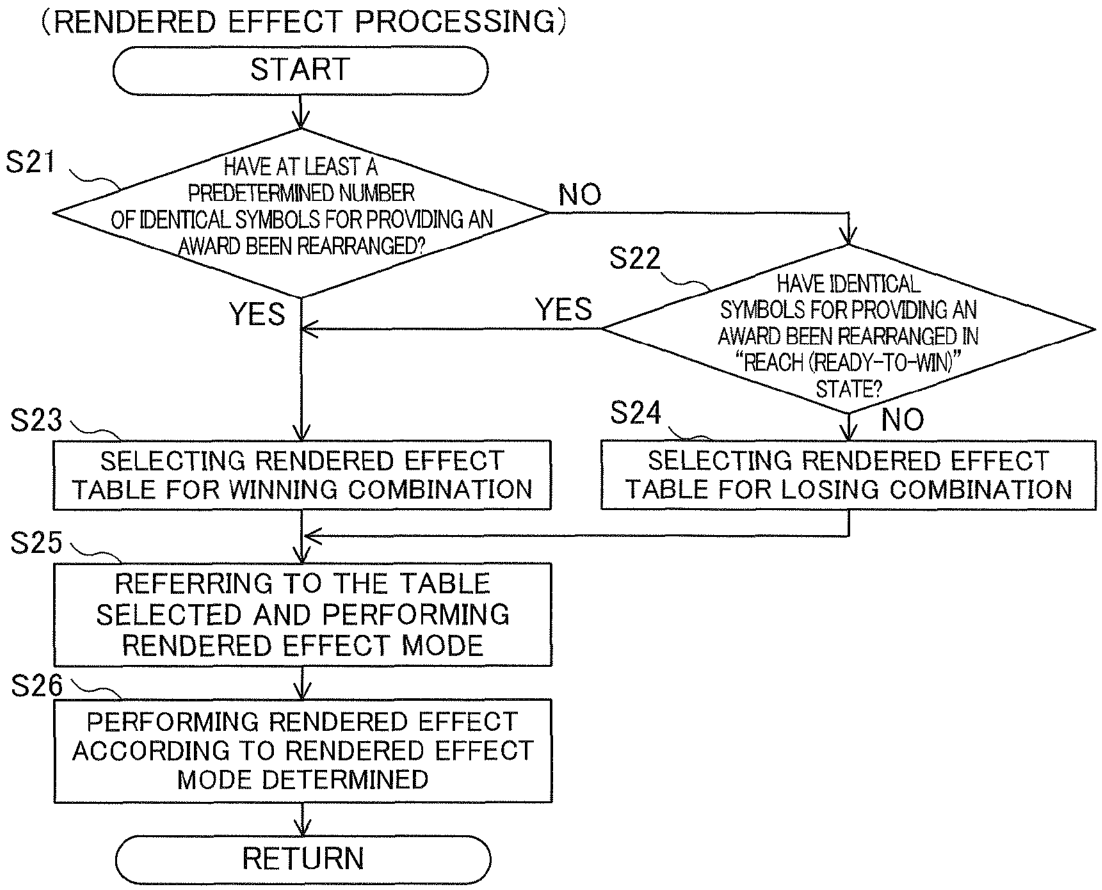
FIG. 9 is a flowchart showing rendered effect processing executed in the gaming machine according to an embodiment of the present invention.

The ROM 108 stores a control program for governing and controlling the gaming machine 13, a program for executing routines as shown in FIGS. 8 and 9 (hereinafter referred to as a "routine execution program"), and initial data for executing the control program, and various data tables used in determination processes. The routine execution program includes the abovementioned game program. On the other hand, examples of the data tables include tables such as those shown in FIG. 10 to FIG. 12. The RAM 110 temporarily stores flags, variables, etc., used for the aforementioned control program.

The game program includes a rearranged symbol determination program. The rearranged symbol determination program is used for determining nine symbols to be rearranged on the symbol display regions 81 to 89. The aforementioned rearranged symbol determination program includes symbol weighing data that corresponds to each of multiple types of payout rates (e.g., 80%, 84%, and 88%). The symbol weighing data is data for each of the three video reels and indicates the corresponding relationship between each symbol and one or multiple random numbers in a predetermined number range (0 to 65535). The payout rate is determined based upon the payout rate setting data stored in the ROM 108. The determination of rearranged symbols is performed based upon the symbol weighing data that corresponds to the payout rate.

Furthermore, a communication interface circuit 111 is connected to the input/output bus 104. The communication interface circuit 111 is a circuit for communicating with a central controller, etc. via the network including various types of networks such as a LAN.

The random number generator 112 for generating a random number is connected to the input/output bus 104. The random number generator 112 generates random numbers in a predetermined range of "0" to "65535" (the sixteenth power of two minus one), for example. Alternatively, an arrangement may be made in which the CPU 106 generates a random number by computation.

The speaker driving circuit 122 for the speakers 41 is also electrically connected with the input/output bus 104. The CPU 106 reads the sound data stored in the ROM 108, and transmits the sound data thus read to the speaker driving circuit 122 via the input/output bus 104. In this way, the speakers 41 generate predetermined sound effects.

The hopper driving circuit 124 for driving the hopper 44 is also electrically connected with the input/output bus 104. Upon receiving a cash out signal input from the cash out switch 26, the CPU 106 transmits a driving signal to the hopper driving circuit 124 via the input/output bus 104. Accordingly, the hopper 44 pays out coins such that the amount thereof is equivalent to the current number of coins remaining as credits, which is stored in a predetermined memory area of the RAM 110.

Alternatively, the payout of the coins may be performed in a mode of storing credit data in a data card or the like, instead of using physical coins. That is, the player may carry a card functioning as a recording medium, and store the data related to the credit by inserting the card into the gaming machine 13.

The lamp driving circuit 126 for driving the decorative lamps 42*a* and 42*b* is also connected with the input/output bus 104. The CPU 106 transmits the signal for driving the lamps according to the predetermined conditions based on the program stored in the ROM 108 to the lamp driving circuit 126. Thus, decorative lamps 42*a* and 42*b* blink and the like.

The display/input controller 140 is connected to the input/output controller 140. The CPU 106 creates an image display command corresponding to the state and results of the game, and outputs the image display command thus created to the display/input controller 140 via the input/output bus 104. Upon receiving the image display command input from the CPU 106, the display/input controller 140 creates a driving signal for driving the liquid crystal display 30 and the liquid crystal display 40 according to the image display command thus input, and outputs the driving signal thus created to the liquid crystal display 30 and the liquid crystal display 40. As a result, a predetermined image is displayed on the liquid crystal display 30 and the liquid crystal display 40. The display/input controller 140 transmits the signal input through the touch panel 32 provided on the liquid crystal display 30 to the CPU 106 via the input/output bus 104 in the form of an input signal. The image display instruction also contains the instructions in accordance with the payout number display portion 48, the credit number display portion 49, and the bet number display portion 50.

Figure 5:
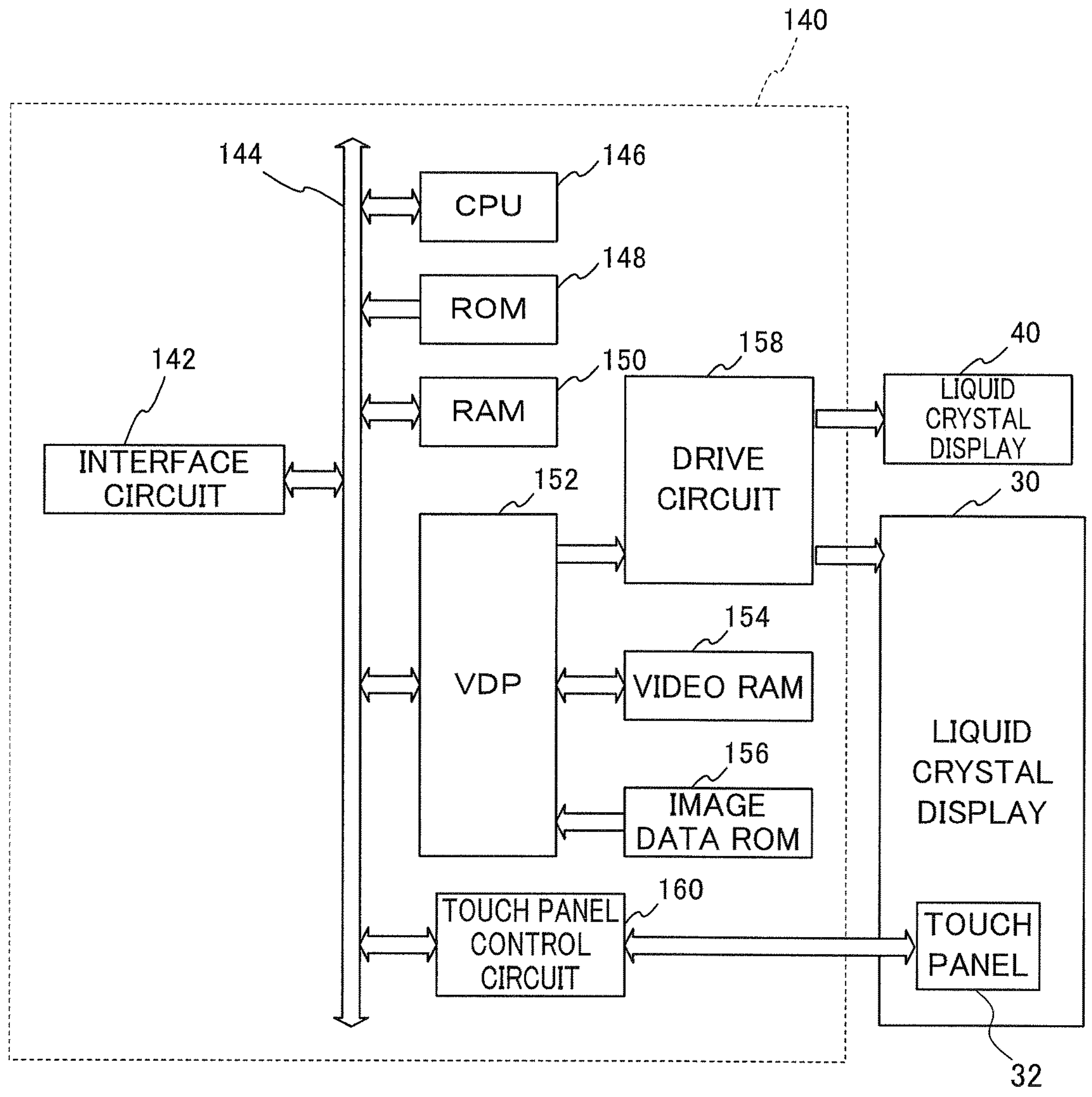
FIG. 5 is a block diagram of a display/input controller of the gaming machine according to an embodiment of the present invention.

FIG. 5 is a block diagram showing the electrical configuration of the display/input controller 140 of the gaming machine 13. The display/input controller 140 is a sub-micro computer which performs image display processing and the control of input from the touch panel 32, and which has an interface circuit 142, an input-output bus 144, CPU 146, ROM 148, RAM 150, VDP 152, video RAM 154, image data ROM 156, a drive circuit 158, and a touch panel control circuit 160.

The interface circuit 142 is connected to the input/output bus 144. An image display instruction outputted from the CPU 106 on the abovementioned game controller 100 is supplied to the input/output bus 144 via the interface circuit 142. The input/output bus 144 performs input/output of data signals or address signals to and from the CPU 146.

The ROM 148 and the RAM 150 are connected to the input/output bus 144. The ROM 148 stores a display control program under which a drive signal to be supplied to the liquid crystal display 30 and the liquid crystal display 40 is generated based on the image display instruction from the CPU 106 on the game controller 100. On the other hand, the RAM 150 stores flags and variables used in the aforementioned display control program.

The VDP 152 is connected to the input/output bus 144. The VDP 152 includes a so-called sprite circuit, a screen circuit, a palette circuit, etc., and can perform various types of processing for displaying images on the liquid crystal display 30 and the liquid crystal display 40. The video RAM 154 and the ROM 156 are connected to the VDP 152. The video RAM 154 stores image data based on the image display instructions from the CPU 106 on the game controller 100. The image data ROM 156 stores various types of image data containing the abovementioned produced image data. Furthermore, the driving circuit 158 for outputting a driving signal for driving the liquid crystal display 30 and the liquid crystal display 40 is connected to the VDP 152.

By reading and executing the display control program stored in the ROM 148, the CPU 146 instructs the video RAM 154 to store image data to be displayed on the liquid crystal display 30 and the liquid crystal display 40 in response to the image display instruction from the CPU 106 on the game controller 100. Examples of the image display commands include various kinds of image display commands including the aforementioned image display commands for rendered effects, etc.

The image data ROM 156 stores various kinds of image data including the aforementioned image data for rendered effects, etc.

The touch panel control circuit 160 transmits the signals input via the touch panel 32 provided on the liquid crystal display 30 to the CPU 106 via the input/output bus 144 in the form of an input signal.

Figure 6:
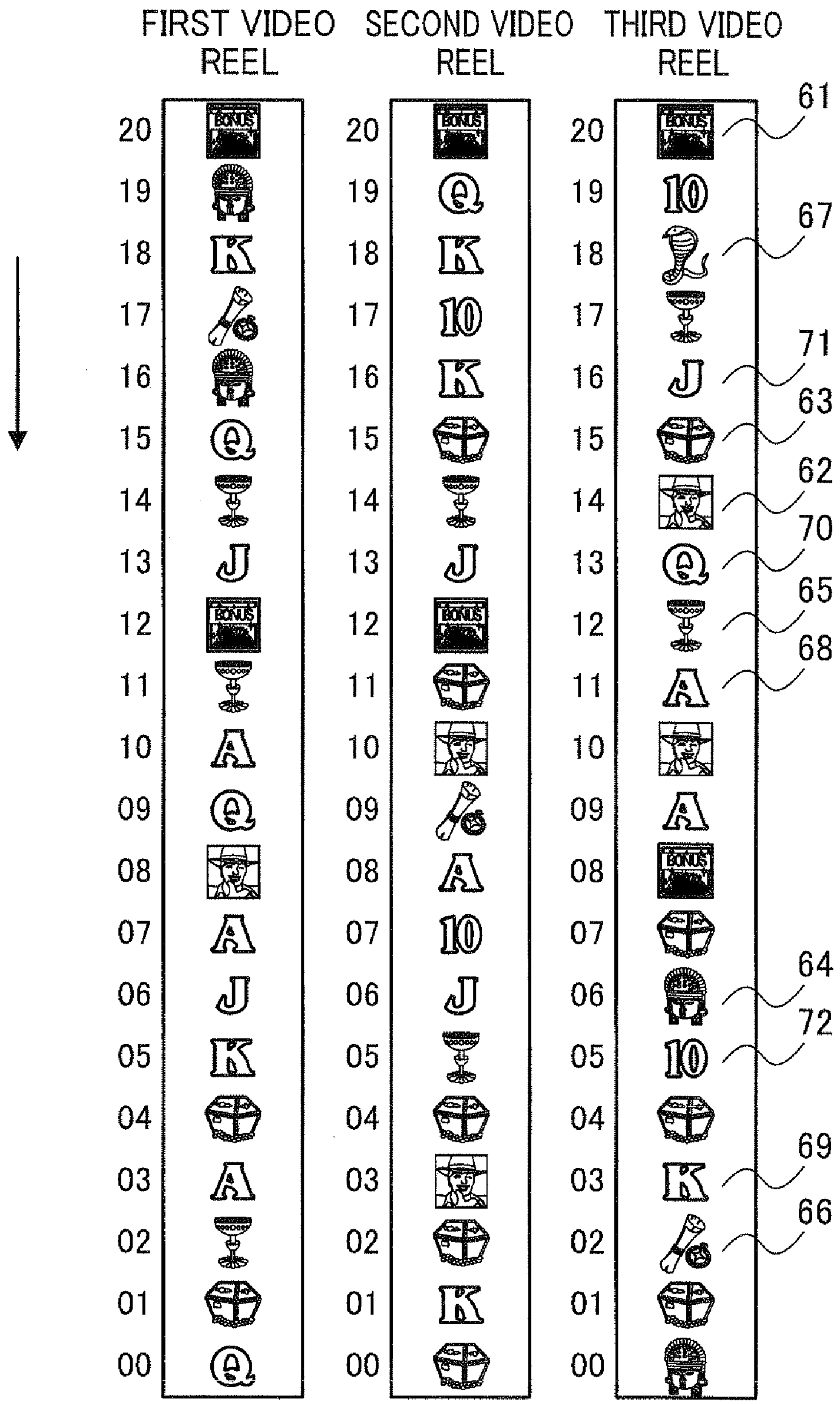
FIG. 6 is a diagram showing columns of symbols displayed on the respective image reels of the gaming machine according to an embodiment of the present invention.

FIG. 6 shows columns of symbols lines that 21 symbols arranged on each video reel 3A through 3C are represented. The symbol line for the first video reel corresponds to the video reel 3A. The symbol line for the second video reel corresponds to the video reel 3B. The symbol line for the third video reel corresponds to the video reel 3C.

Referring to FIG. 6, a code number of "00"-"20" is referred to each symbol of video reels 3A through 3C. These code numbers are turned to be data in a data table so as to be stored in the aforementioned ROM 108 (FIG. 4).

The column of symbols is represented on the video reels 3A to 3C, respectively. Specifically, the column of symbols is made up of "BONUS" symbol (symbol 61) (hereinafter abbreviated to "BONUS"), "WILD" symbol (symbol 62) (hereinafter abbreviated to "WILD"), "TREASURE BOX" symbol (symbol 63) (hereinafter abbreviated to "TREASURE BOX"), "GOLDEN MASK" symbol (symbol 64) (hereinafter abbreviated to "GOLDEN MASK"), "HOLY GRAIL" symbol (symbol 65) (hereinafter abbreviated to "HOLY GRAIL"), "COMPASS&MAP" symbol (symbol 66) (hereinafter abbreviated to "COMPASS&MAP"), "SNAKE" symbol (symbol 67) (hereinafter abbreviated to "SNAKE"), "A" symbol (symbol 68) (hereinafter abbreviated to "A"), "K" symbol (symbol 69) (hereinafter abbreviated to "K"), "Q" symbol (symbol 70) (hereinafter abbreviated to "Q"), "J" symbol (symbol 71) (hereinafter abbreviated to "J"), and "10" symbol (symbol 72) (hereinafter abbreviated to "10"). The columns of symbols on the image reels 3A to 3C can be moved by the display of an image where the reels 3A to 3C are spinning in a forward direction.

In the present embodiment, "BONUS", "WILD", "SNAKE", "TREASURE BOX", "GOLDEN MASK", "HOLY GRAIL", "COMPASS&MAP", "A", "K", "Q", "J", and "10" are provided as predetermined winning combinations, respectively. The winning combinations (winning combination data) are basically control information which associates advantages given to a player (the numbers of payout coins) with symbol combinations for providing awards, and which are used to control the stopping of the video reels 3A to 3C, the switching (conversion) of the state of the game, and the supply of coins.

FIG. 7 shows a symbol arrangement table. The symbol arrangement table relates the code number indicating the position of each symbol which constitutes the aforementioned columns of symbols to each symbol of the respective video reels 3A to 3E, and then, registers thereof. In addition, the first video reel through the fifth video reel corresponds to the video reels 3A to 3C, respectively. In other words, the symbol arrangement table includes symbol information corresponding to the symbol position (the code number) of video reels 3A to 3C.

In FIG. 7, "TREASURE," "MASK," and "COMPASS" are abbreviations for the above-mentioned "TREASURE BOX," "GOLDEN MASK," and "COMPASS&MAP," respectively.

FIG. 8 is a flowchart showing the flow of processing in the basic game of the gaming machine 13 to be executed by the game controller 100 of the gaming machine 13. The single routine of FIG. 8 is a unit game.

It should be noted that the gaming machine 13 is activated in advance and the variables used in the CPU 106 on the game controller 100 are initialized to predetermined values, respectively, thereby providing normal operation of the gaming machine 13.

Firstly, the CPU 106 on the game controller 100 determines whether a certain amount of credits remains, which is the number of remaining coins inserted by the player (Step S1). More specifically, the CPU 106 reads the amount of credits C stored in the RAM 110, and executes processing according to the amount of credits C. When the amount of credits C equals "0" (in the case of a "NO" determination by the processing of Step S1), the CPU 106 terminates the routine without executing any processing, since it cannot start a game. When the amount of credits C is not less than "1" (in the case of a "YES" determination by the processing of Step S1), the CPU 106 determines that coins remain as credits, and the CPU 106 moves the processing to Step S2.

In Step S2, the CPU 106 determines whether or not a pressing operation has been applied to the spin bet repeat switch 24. When the switch 24 has been pushed and the CPU 106 receives an operation signal from the switch 24 (in the case of a "YES" determination by the processing of Step S2), the CPU 106 moves the processing to Step S14. On the other hand, when the CPU 106 does not receive the operation signal from the switch 24 after a predetermined period of time elapses (in the case of a "NO" determination by the processing of Step S2), the CPU 106 determines that the switch 24 has not been pressed and moves the processing to Step S3.

In the following Step S3, the CPU 106 sets the game conditions. More specifically, the CPU 106 determines the number of coins bet in a unit game based on the operation of the bet switch 23. The CPU 106 receives the operation signals generated by the player operating the bet switch 23. Then, the CPU 106 stores the bet amount in a predetermined memory area of the RAM 110 based on the number of times the operation signals have been received. The CPU 106 reads the amount of credits C stored in a predetermined memory area of the RAM 110, and subtracts the abovementioned bet amount from the amount of credits C thus read. Then, the CPU 106 stores the subtracted value in a predetermined memory area of the RAM 110. Subsequently, the CPU 106 moves the processing to Step S4.

In the following Step S4, the CPU 106 determines whether the start switch 25 is ON, and then, waits for the start switch 25 to be operated. Upon the start switch 25 being operated, and accordingly, upon the operation signal being input from the start switch 25 (in the case of a "YES" determination by the processing of Step S4), the CPU 106 determines that the start switch 25 has been operated, and moves the processing to Step S5.

On the other hand, in Step S14, the CPU 106 determines whether the amount of credits C is at least the total bet number in a previous game. In other words, the CPU 106 determines whether it can start a game in response to a pressing operation applied to the spin repeat bet switch 24. More specifically, when the spin repeat bet switch 24 has been pushed, and the operation signal has been inputted to the CPU 106 from the spin repeat bet switch 24, the CPU 106 reads the credit amount C and the bet amount bet in the previous game, which are stored in RAM 110. Then, the CPU 106 determines whether or not the credit amount C is equal to or greater than the bet amount bet in the previous game based upon the relation between the credit amount C thus read and the bet amounts. The CPU 106 performs processing based upon the determination results. When the CPU 106 determines that the amount of credits C is less than the bet amount (in the case of a "NO" determination by the processing of Step S14), the CPU 106 terminates the present routine without any processing, since it cannot start a game. On the other hand, in a case where determination has been made that the aforementioned amount of credits C is at least the bet amount bet in the previous game (in the case of a "YES" determination by the processing of Step S14), the CPU 106 subtracts the bet amount bet in the previous game from the aforementioned amount of credits C, and stores the subtracted value in a predetermined area of the RAM 110. Subsequently, the CPU 106 moves the processing to Step S5.

In the following Step S5, the CPU 106 performs rearranged symbol determination processing. A specific description is made below regarding the rearranged symbol determination processing.

First, the CPU 106 selects a random number in a range of values from 0 to 65535 for each of the three reels by extracting a random number from the random generator 112. Next, the CPU 106 reads payout rate setting data from the ROM 108 to store thereof in the RAM 110, refers to symbol weighing data corresponding to the payout rate setting data, and determines symbols in the three reels to be rearranged in each of the symbol display regions 81 to 89 based on the three random numbers values thus selected. The CPU 106 determines symbols to be rearranged in the symbol display regions 81 to 89, thereby determining a winning combination. In the present embodiment, in a case where three or more identical symbols are rearranged in the symbol display regions 81 to 89, a winning combination corresponding to the rearranged symbols is achieved.

Upon determining a rearranged symbol, the CPU 106 determines whether at least a predetermined number of identical symbols (three symbols) for providing an award among nine symbols to be rearranged are rearranged or not. In a case where at least a predetermined number of identical symbols (three symbols) for providing an award among nine symbols to be rearranged are rearranged, the CPU 106 activates a flag indicating providing an award in order to generate an award corresponding to the predetermined number of identical symbols (three symbols) for providing an award. The activated flag, which indicates the player has won an award, is stored in a predetermined area of the RAM 110 according to the instruction from the CPU 106. On the other hand, in a case where at least a predetermined number of identical symbols (three symbols) for providing an award among nine symbols to be rearranged are not rearranged (a losing combination), the CPU 106 does not activate the flag indicating providing the award. Subsequently, the CPU 106 moves the processing to Step S6.

In the following Step S6, the CPU 106 instructs each of the three video reels to start to rotate. The CPU 106 then moves the processing to Step S7. In addition, rendered effect processing of Step S7 is described in detail with reference to FIG. 9.

Upon performing rendered effect processing in Step S7, the CPU 106 waits for a predetermined period of time to elapse (Step S8). After the predetermined period of time has elapsed (in the case of a "YES" determination by the processing of Step S8), the CPU 106 instructs each of the three video reels to stop rotating, thereby rearranging nine symbols (Step S9). In the present embodiment, symbol rearrangement is performed by way of stopping the rotation of the three video reels in the order of the video reels 3A, 3B, and 3C. The CPU 106 then moves the processing to Step S10.

In the following Step S10, the CPU 106 determines whether the flag indicating that an award is provided, which is stored in a predetermined memory area in the RAM 110, is activated or not by means of the rearranged symbol determination processing in Step S5. In a case where the flag indicating that an award is provided is not activated (in the case of a "NO" determination by the processing of Step S10), the CPU 106 terminates the present routine. On the other hand, in a case where the flag indicating that an award is provided is activated (in the case of a "YES" determination by the processing of Step S10), the CPU 106 advances the processing to Step S11.

In the following Step S11, the CPU 106 determines whether the flag (a bonus flag) indicating a switch to a bonus game, which is stored in a predetermined memory area in the RAM 110, is activated or not by the rearranged symbol determination processing in Step S5. More specifically, in a case where the flag indicating the switch to a bonus game is activated (in the case of a "YES" determination by the processing of Step S11), the CPU 106 advances the processing to Step S12. On the other hand, in a case where the flag indicating the switch to a bonus game is not activated (in the case of a "NO" determination by the processing of Step S11), the CPU 106 advances the processing to Step S13.

In the following Step S12, the CPU 106 performs bonus game processing. More specifically, the CPU 106 starts a bonus game and performs a predetermined number of the bonus games. Subsequently, the CPU 106 terminates the routine.

In the following Step S13, the CPU 106 pays out the amount of coins corresponding to the number of the rearranged identical symbols which are not less than a predetermined number (three symbols). More specifically, the CPU 106 refers to a payout table (FIG. 10) and determines the amount of coins to be paid out, corresponding to the number of the rearranged identical symbols (a symbol combination) which are more than a predetermined number (three symbols). The CPU 106 reads the credit amount stored in the aforementioned predetermined memory area of the RAM 110. Then, the CPU 106 calculates the sum total amount of coins to be paid out thus determined and the credit amount thus read, and stores the sum thus calculated in a predetermined memory area of the RAM 110. The CPU 106 displays the aforementioned value thus stored on the credit number display portion 49. Subsequently, the CPU 106 terminates the present routine.

Rendered effect processing is described with reference to FIG. 9.

Firstly, in Step S21 of the FIG. 9, the CPU 106 determines whether at least a predetermined number (three) of identical symbols for providing an award is rearranged or not. The identical symbol includes any one of the following symbols: "BONUS", "WILD", "TREASURE BOX", "GOLDED MASK", "HOLY GRAIL", and "COMPASS & MAP". More specifically, the CPU 106 determines whether three or more identical symbols are rearranged in the symbol display regions 81 to 89. In the case of a "YES" determination, the processing advances to Step S23. In the case of a "NO" determination, the processing advances to Step S22.

In Step S22, the CPU 106 determines whether identical symbols for providing an award are rearranged in a "REACH" (ready-to win) state. More specifically, the CPU 106 determines whether or not the identical symbols for providing an award are included in each of the symbol groups to be rearranged other than the abovementioned symbol group (symbols in these symbol groups are rearranged in the symbol display regions 81 to 86 that correspond to the video reels 3A and 3B), and not in the symbol group to be rearranged last (symbols in this symbol group are rearranged in the symbol display regions 87 to 89 that correspond to the video reel 3C), and not among symbols rearranged in the symbol display regions 81 to 89 in the present embodiment. In other words, in the present embodiment, the CPU 106 determines whether identical symbols for providing an award are included in the symbol groups to be rearranged first and second and whether the identical symbols for providing an award are not included in the symbol groups to be rearranged last (third). In the case of a "YES" determination, the processing advances to Step S23. In the case of a "NO" determination, the processing advances to Step S24.

In Step S23, the CPU 106 selects a rendered effect determination table for a winning combination, which is described later in FIG. 11. Here, the rendered effect determination table for a winning combination is provided to each type of symbol for providing an award. For example, in a case where the winning combination of "HOLY GRAIL" is determined to be achieved when three or more "HOLY GRAIL" symbols are rearranged, or in a case where "HOLY GRAIL" symbols are rearranged in a REACH (ready-to-win) state, even though the winning combination of "HOLY GRAIL" is not determined to be achieved, the rendered effect determination table for a winning combination that corresponds to the "HOLY GRAIL" is selected. Then, the processing advances to Step S25.

In Step S24, the CPU 106 selects a rendered effect determination table for a losing combination which is described later in FIG. 12. Then, the processing advances to Step S25.

In Step S25, the CPU 106 refers to the table selected in Step S23 or Step S24 so as to determine a rendered effect mode. Upon determining a rendered effect mode, the CPU 106 selects a random number in a range of values from 0 to 255 by extracting a random number from the random generator 112 so as to determine a rendered effect mode that corresponds to the random number thus selected.

In Step S26, the CPU 106 starts to perform a rendered effect in the rendered effect mode thus determined. Afterwards, the processing advances to Step S8 of FIG. 8.

A payout table is described with reference to FIG. 10. The payout table is the table to which the CPU 106 refers when determining the amount of coins to be paid out in Step S13 of FIG. 8. For example, in a case where a symbol combination is "HOLY GRAIL", the amount of coins to be paid out is "30".

In addition, in FIG. 10, "TREASURE", "MASK", and "COMPASS" are abbreviations for the abovementioned "TREASURE BOX", "GOLDEN MASK", and "COMPASS & MAP", respectively.

The rendered effect determination table for a winning combination is described with reference to FIG. 11. The rendered effect determination table for a winning combination is the table to which the CPU 106 refers when determining a rendered effect mode in Step S25 of FIG. 9. For example, in a case where the random number thus generated is "80", since this number belongs to the range of "0 to 99", the rendered effect mode is determined to be "Rendered Effect A". The other rendered effect modes B to D correspond to each of the ranges including random number values.

The rendered effect determination table for a losing combination is described with reference to FIG. 12. The rendered effect determination table for a losing combination is the table to which the CPU 106 refers when determining a rendered effect mode in Step S25 of FIG. 9. For example, in a case where the random number thus generated is "55", since this number belongs to the range of "0 to 80", the rendered effect mode is determined to be "Rendered Effect a". The other rendered effect modes b to f correspond to each of the ranges including random number values.

FIGS. 13 to 17 are diagrams showing images that provide rendered effect images. In FIGS. 13 to 17, in a display region of the liquid crystal display 30, an image of a slot game is displayed on the upper display region and a rendered effect image is displayed on the lower display region.

Here, in the present embodiment, in a case where at least a predetermined number (three) of identical symbols for providing an award is determined to be rearranged so as to provide an award, or in a case where the identical symbols are rearranged in a "REACH" state, which is not a winning combination, i.e. a losing combination, a rendered effect that enables the feeling of suspense for winning for providing an award corresponding to the identical symbols is performed.

Figure 13:
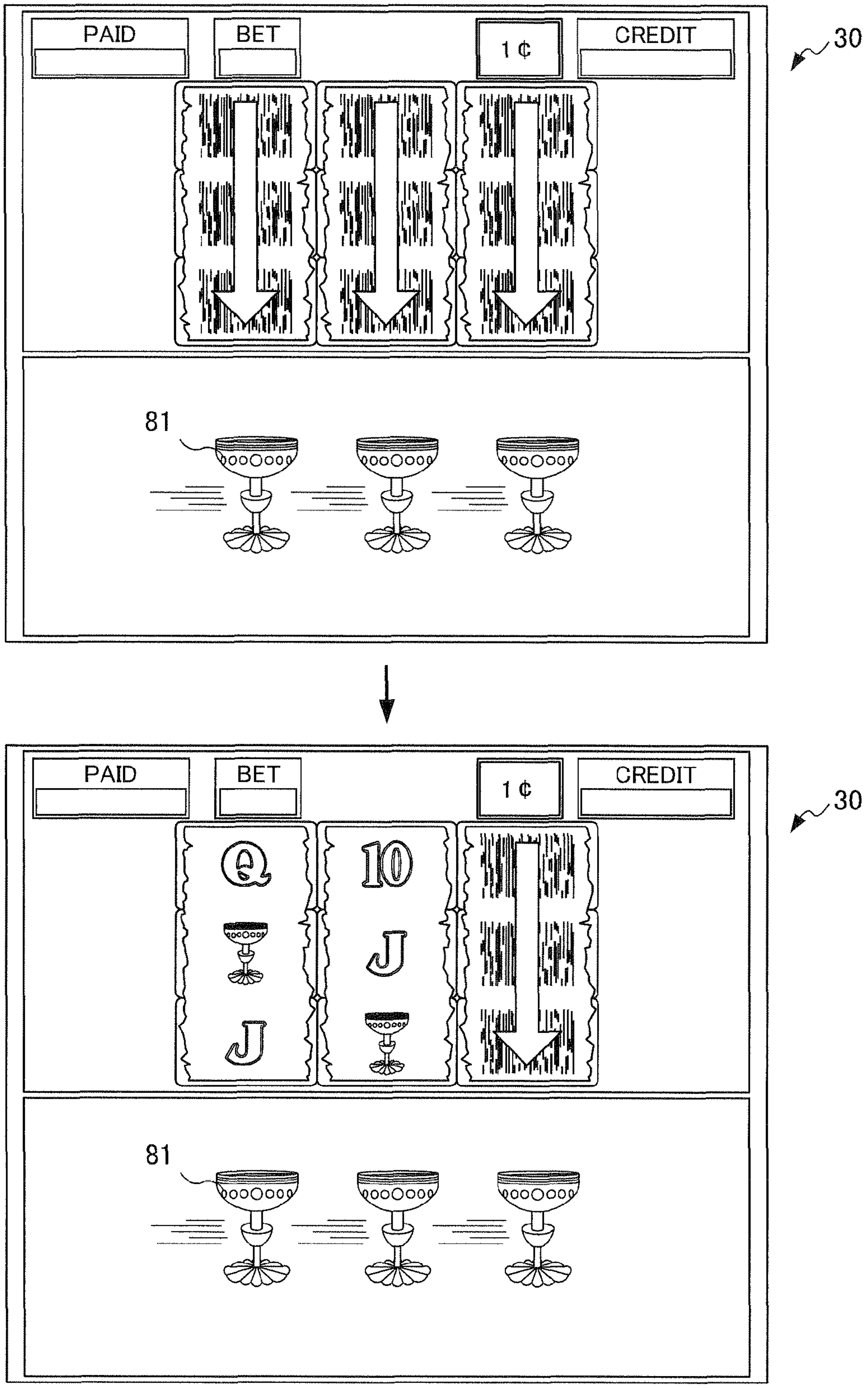
FIGS. 13 to 22 are examples of display screens displaying rendered effects executed in the gaming machine according to an embodiment of the present invention.

FIG. 13 illustrates that all the reels from the first reel 3A to the third reel 3C are being rotated, and then the first reel 3A and the second reel 3B are stopped.

With reference to FIG. 13, a rendered effect image is displayed, which shows that the HOLY GRAIL symbol 81 appears while the first reel 3A to the third reel 3C are being rotated. This rendered effect image is displayed when "Rendered Effect A" is determined based on the rendered effect determination table for a winning combination in FIG. 11. By looking at these images, the player can have a feeling of suspense for winning an award corresponding to "HOLY GRAIL". Next, when the first reel 3A and the second reel 3B are stopped, the total number of "HOLY GRAIL" symbols thus rearranged is two. In addition, a rendered effect image showing that the "HOLY GRAIL" symbol 81 is going to appear continues to be displayed. Thus, the play can have a maintained feeling of suspense for winning an award corresponding to "HOLY GRAIL" if the "HOLY GRAIL" symbol is rearranged when the third reel 3C comes to rest.

Figure 14:
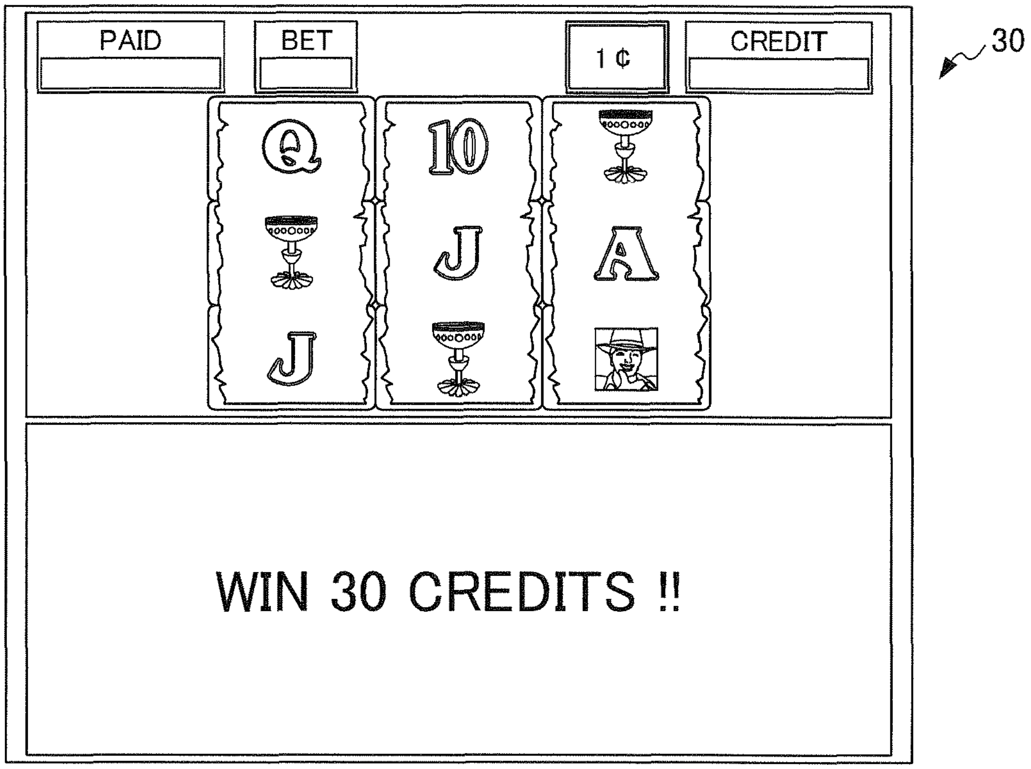

FIG. 14 illustrates that the first reel 3A and the second reel 3B are stopped, and then the third reel 3C is stopped, following the condition shown in FIG. 13.

According to FIG. 14, three "HOLY GRAIL" symbols are rearranged. Thus, the player can recognize that a winning combination of "HOLY GRAIL" is achieved. In addition, since a message "WIN 30 CREDITS!!" is displayed as well, the player can recognize that a winning combination of "HOLY GRAIL" has been achieved.

Figure 15:
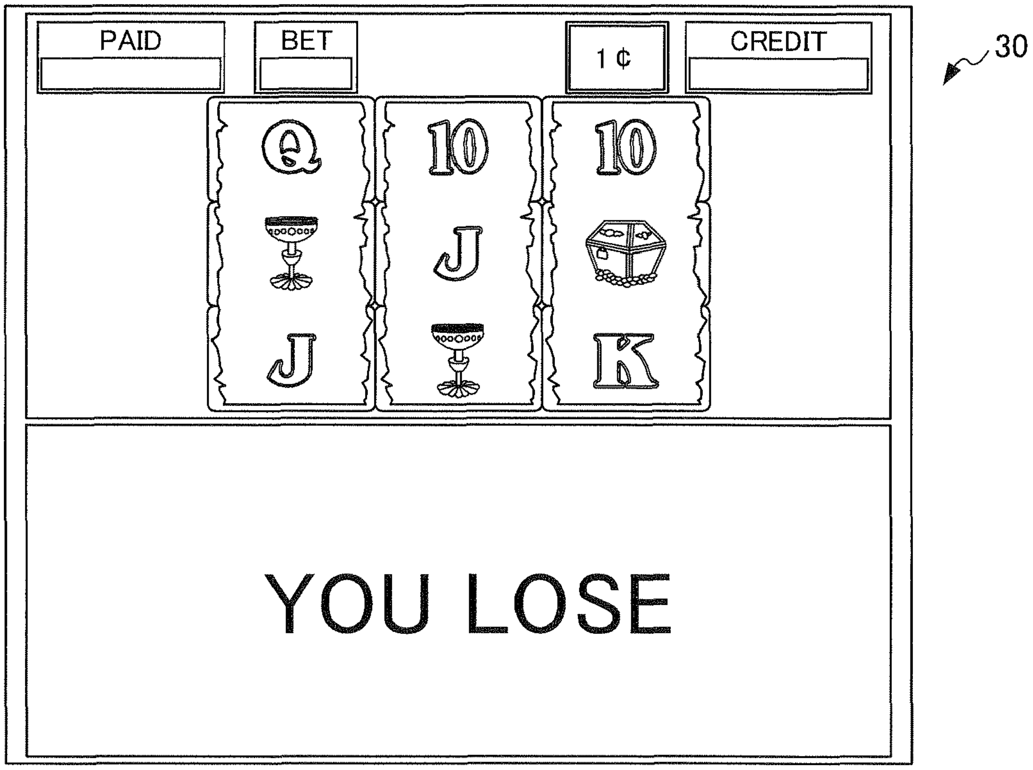

FIG. 15 illustrates that the first reel 3A and the second reel 3B are stopped, and then the third reel 3C is stopped, following the condition shown in FIG. 13.

According to FIG. 15, a "HOLY GRAIL" symbol is not rearranged in the symbol display region corresponding to the third reel 3C when the rotation of the third reel 3C comes to rest. Thus, the player can recognize that a winning combination of "HOLY GRAIL" has not been achieved. In addition, since a message "YOU LOSE" is displayed as well, the player can recognize that a winning combination of "HOLY GRAIL" has not been achieved.

Figure 16:
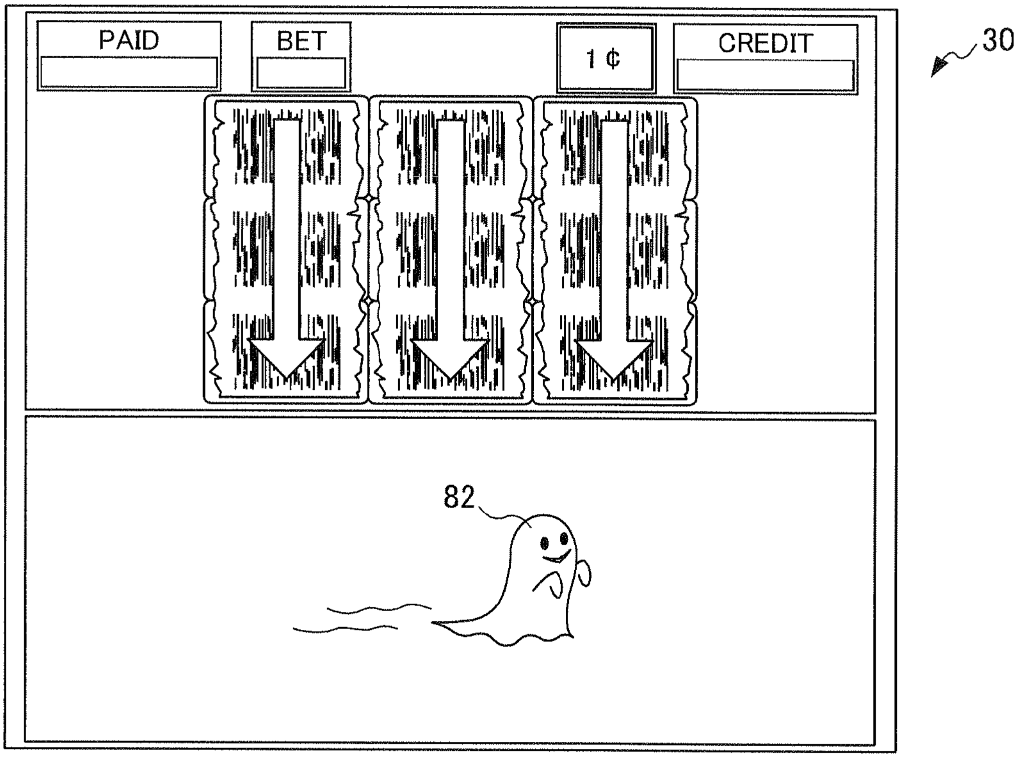

FIG. 16 illustrates that all the reels from the first reel 3A to the third reel 3C are being rotated.

According to FIG. 16, an image showing a GHOST symbol 82 appearing is displayed while the first reel 3A to the third reel 3C are being rotated. This rendered effect image is displayed when "Rendered Effect a" is determined based on the rendered effect determination table for a losing combination in FIG. 12. Thus, the rendered effect image allows a player to recognize that the player is going to lose the game without achieving a "REACH" state. In addition, the rendered effect image continues to be displayed until the first reel 3A and the second reel 3B come to rest, and then the third reel 3C comes to rest.

Figure 17:
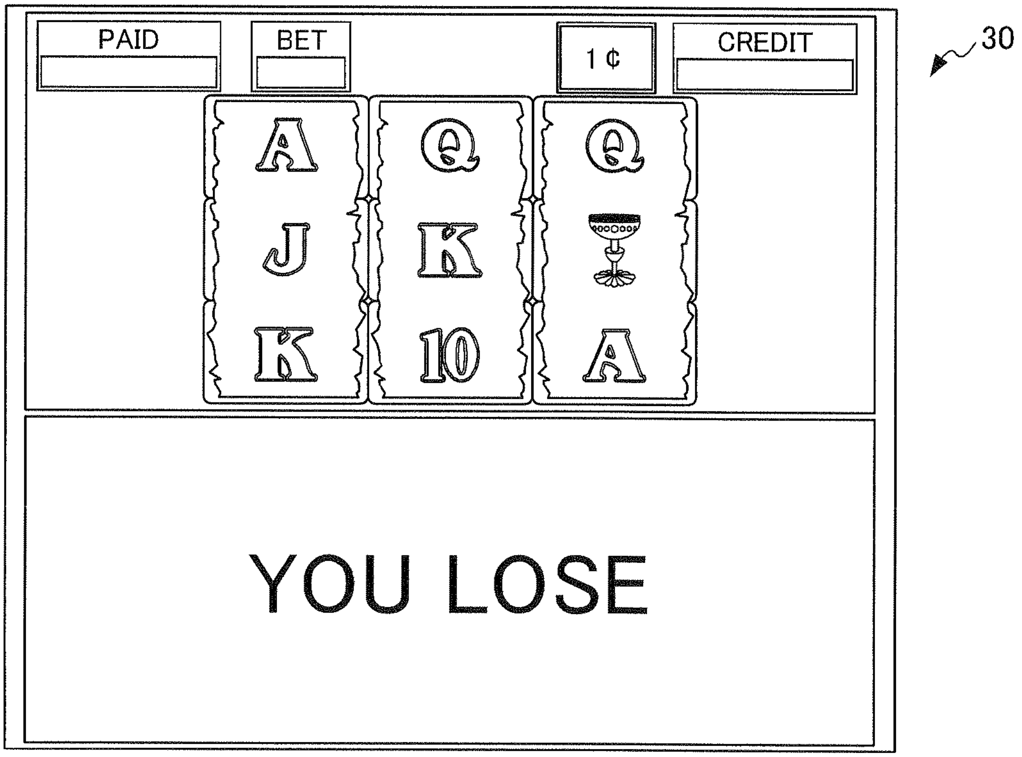

FIG. 17 illustrates that all the reels from the first reel 3A to the third reel 3C come to rest following the condition shown in FIG. 16.

According to FIG. 17, when the third reel 3C comes to rest, a predetermined number (three) of identical symbols for providing an award is not rearranged. The identical symbol includes any one of the following symbols: "BONUS", "WILD", "TREASURE BOX", "GOLDED MASK", "HOLY GRAIL", and "COMPASS & MAP". Thus, the player can recognize that no winning combination has been achieved. In addition, since a message "YOU LOSE" is displayed as well, the player can recognize that no winning combination has been achieved.

Accordingly, in a case where a combination with a "REACH" state is achieved even if it ends up with a losing combination, a rendered effect, which is the same as that performed when a winning combination is achieved, is performed to enable the player to maintain the feeling of suspense for winning to the end. On the other hand, in a case where a combination with a "REACH" state is not formed, a rendered effect dedicated to a losing combination is performed, thereby preventing the player from having the feeling of suspense for winning. Consequently, the present invention provides a gaming machine with new entertainment properties which performs rendered effects that enables the feeling of suspense for winning to be sustained according to a symbol combination rearranged upon a losing result.

While the embodiment of the gaming machine according to the present invention has been described, it is to be understood that the above description is intended to be illustrative, and not limiting, and any changes in design may be made to specific configurations such as various means. Moreover, it should be understood that the advantages described in association with the embodiments are merely a listing of most preferred advantages, and that the advantages of the present invention are by no means restricted to those described in connected with the embodiments.

For example, although in the present embodiment, an example applied to a video reel slot machine is explained regarding the present invention, the present embodiment is not limited thereto, and for example, the present invention may be applied to a mechanical reel slot machine.

In addition, although the rotation of the video reels 3A, 3B, and 3C are stopped in this order in the present embodiment, the present invention is not limited thereto, and the rotation of these reels may be stopped in another order such as in the order of 3B, 3C, 3A.

In addition, although rendered effects are performed after starting rotation of the video reels 3A to 3C in the present embodiment, the present invention is not limited thereto, and the rendered effects may be performed before starting rotation of the video reels 3A to 3C after symbols to be rearranged are determined.

Furthermore, in the present embodiment, although a game is performed under the condition that winning is achieved in a case where at least a predetermined number of identical symbols for providing an award is rearranged, the present invention is not limited thereto, and a game may be performed under the condition that winning is achieved in a case where a predetermined number of identical symbols for providing an award is rearranged on a pay line. In the following, rendered effect images performed under the condition that winning is achieved in a case where a predetermined number of identical symbols for providing an award is rearranged on a pay line are described with reference to FIGS. 18 to 22.

FIGS. 18 to 22 show rendered effect images of a modified example of the present embodiment. In FIGS. 18 to 22, in a display region of the liquid crystal display 30, the images of slot games are displayed on the upper display region and the images that provide visual effects are displayed on the lower display region.

Here, in the modified example, in a case where a predetermined number (three) of identical symbols is determined to be rearranged on a pay line to provide an award, or in a case where identical symbols for providing an award are rearranged in a "REACH" state, which is not a winning combination, i.e. a losing combination, a rendered effect that imparts the feeling of suspense for winning an award corresponding to the identical symbols is performed.

Figure 18:
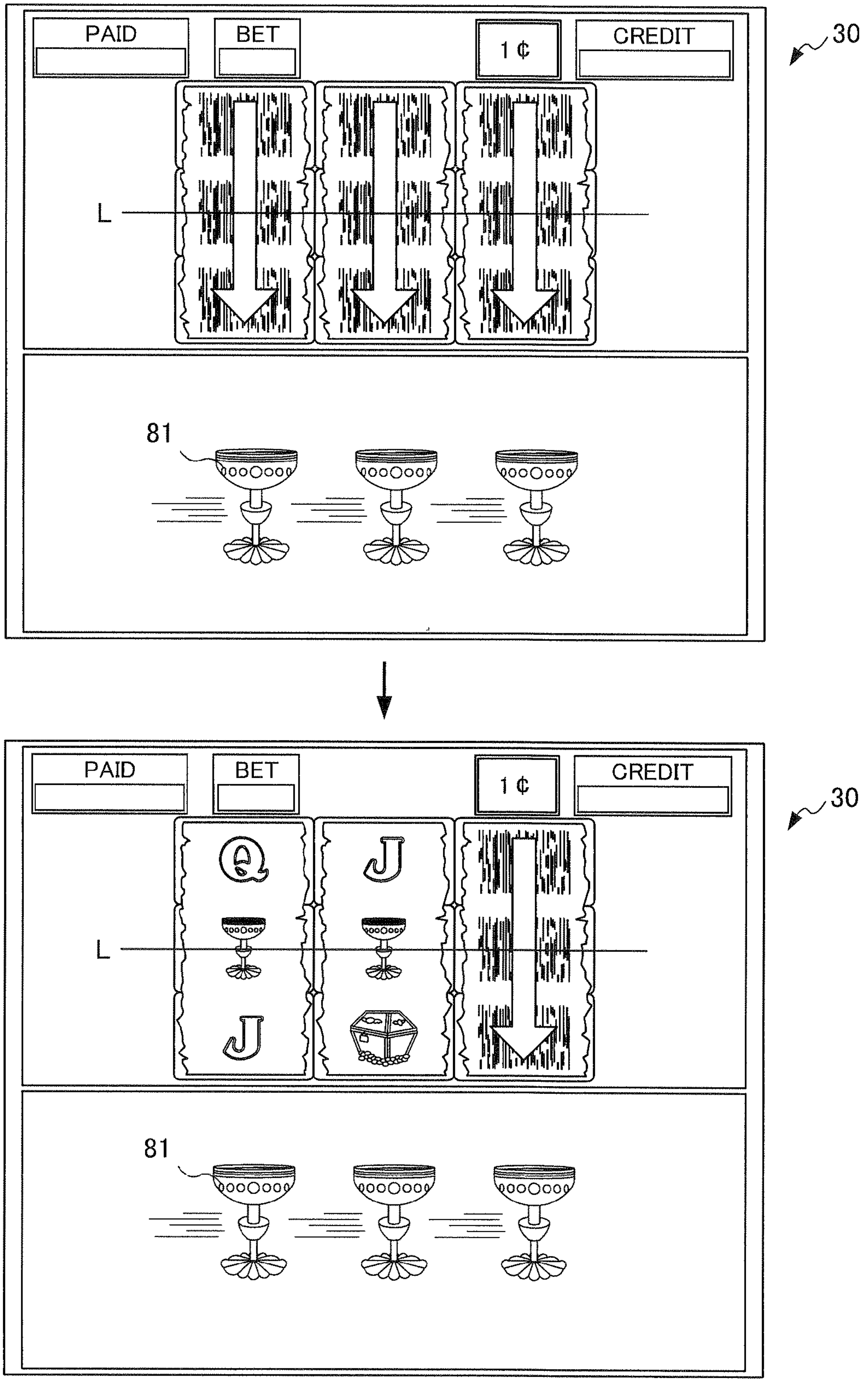

FIG. 18 illustrates that all the reels from the first reel 3A to the third reel 3C are being rotated, and then the first reel 3A and the second reel 3B are stopped.

With reference to FIG. 18, a rendered effect image is displayed, which shows that the HOLY GRAIL symbol 81 appears while the first reel 3A to the third reel 3C are being rotated. This rendered effect image is displayed when "Rendered Effect A" is determined based on the rendered effect determination table for a winning combination in FIG. 11. By seeing these images, the player can have a feeling of suspense for winning an award corresponding to "HOLY GRAIL". Next, when the first reel 3A and the second reel 3B are stopped, the total number of "HOLY GRAIL" symbols thus rearranged on the pay line L is two. In addition, a rendered effect image showing that the "HOLY GRAIL" symbol 81 is going to appear continues to be displayed. Thus, the rendered effect image enables a player to have a maintained feeling of suspense for winning an award corresponding to "HOLY GRAIL" if the "HOLY GRAIL" symbol is rearranged on the pay line L when the third reel 3C comes to rest.

Figure 19:
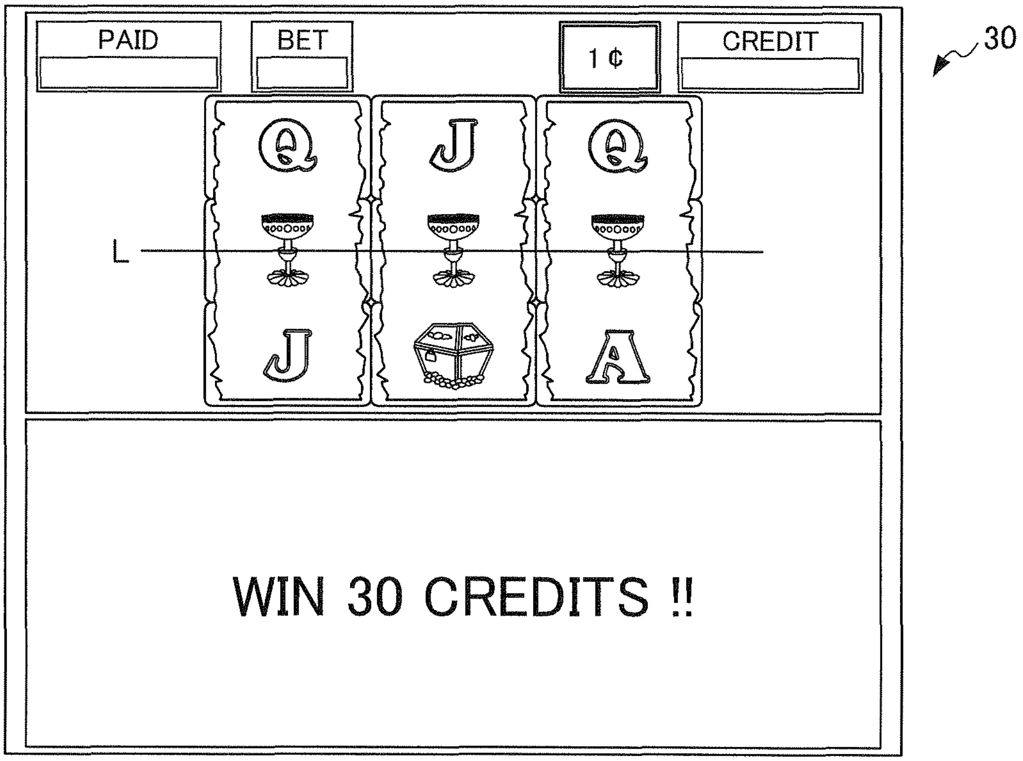

FIG. 19 illustrates that the first reel 3A and the second reel 3B are stopped, and then the third reel 3C is stopped, following the condition shown in FIG. 18.

According to FIG. 19, three "HOLY GRAIL" symbols are rearranged on the pay line L. Thus, the player can recognize that a winning combination of "HOLY GRAIL" has been achieved. In addition, since a message "WIN 30 CREDITS!!" is displayed as well, the player can recognize that a winning combination of "HOLY GRAIL" has been achieved.

Figure 20:
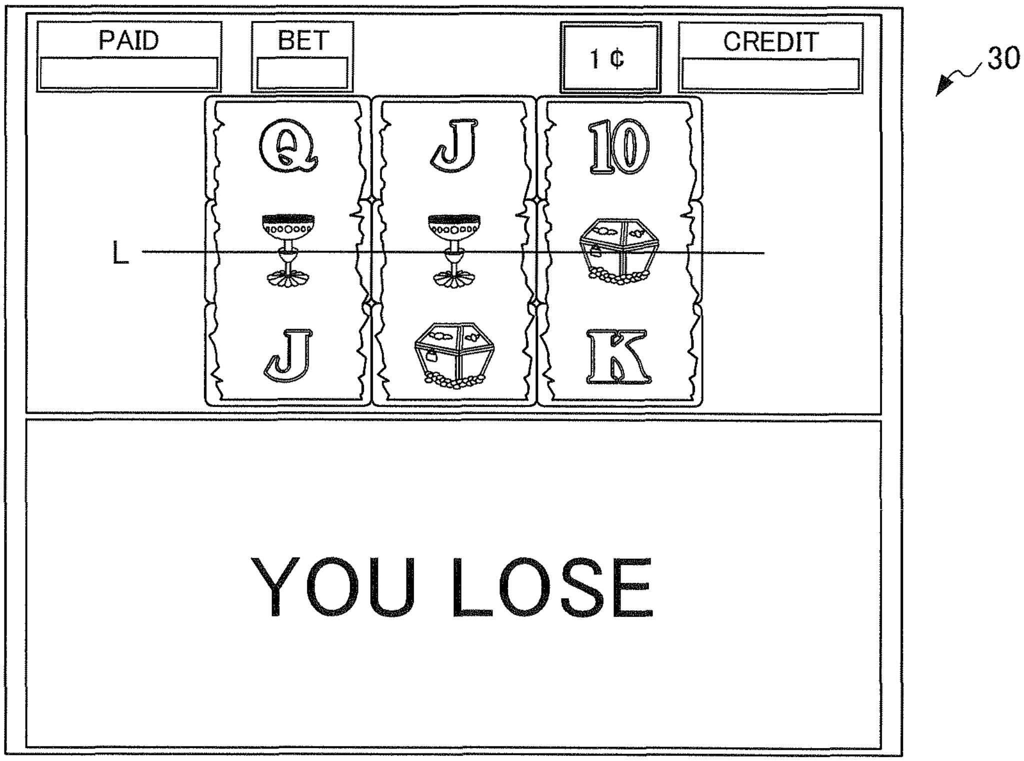

FIG. 20 illustrates that the first reel 3A and the second reel 3B are stopped, and then the third reel 3C is stopped, following the condition shown in FIG. 18.

According to FIG. 20, a "HOLY GRAIL" symbol is not rearranged in the symbol display region corresponding to the third reel 3C when the rotation of the third reel 3C comes to rest. Thus, the player can recognize that a winning combination of "HOLY GRAIL" has not been achieved. In addition, since a message "YOU LOSE" is displayed as well, the player can recognize that a winning combination of "HOLY GRAIL" has not been achieved.

Figure 21:
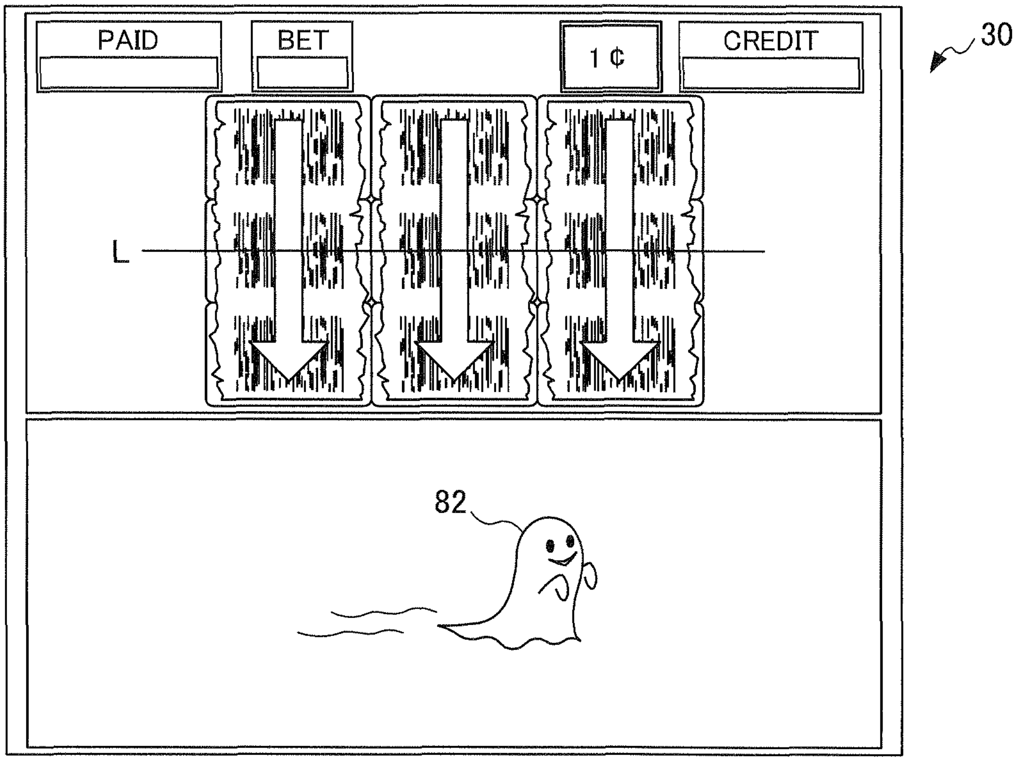

FIG. 21 illustrates all the reels from the first reel 3A to the third reel 3C being rotated.

According to FIG. 21, an image showing a GHOST symbol 82 appearing is displayed while the reels from the first reel 3A to the third reel 3C are being rotated. This rendered effect image is displayed when "Rendered Effect a" is determined based on the rendered effect determination table for a losing combination in FIG. 12. Thus, by looking at these images, the player can recognize that the game will be lost without achieving a "REACH" state. In addition, the rendered effect image continues to be displayed until the first reel 3A and the second reel 3B come to rest, and then the third reel 3C comes to rest.

Figure 22:
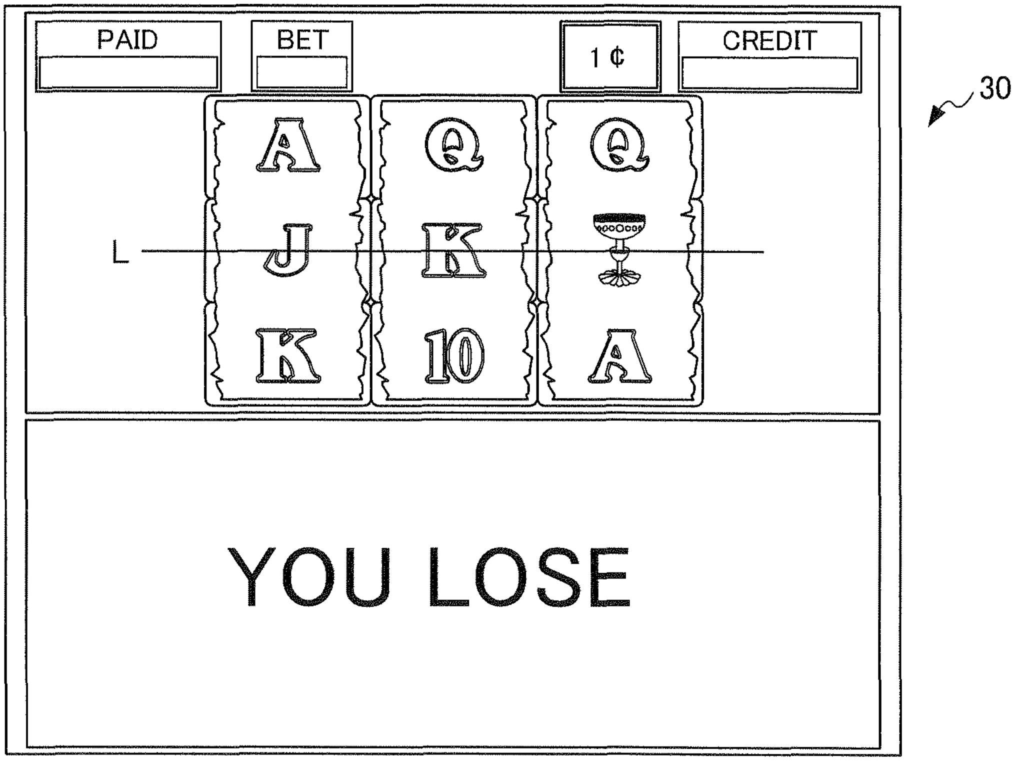

FIG. 22 illustrates that all the reels from the first reel 3A to the third reel 3C come to rest following the condition shown in FIG. 21.

According to FIG. 22, when the third reel 3C comes to rest, a predetermined number (three) of identical symbols for providing an award is not rearranged on the pay line L. The identical symbol includes any one of the following symbols: "BONUS", "WILD", "TREASURE BOX", "GOLDED MASK", "HOLY GRAIL", and "COMPASS & MAP". Thus, the player can recognize that no winning combination has been achieved. In addition, since a message "YOU LOSE" is displayed as well, the player can recognize that no winning combination has been achieved.

Furthermore, rendered effect processing of the present modified example is described with reference to FIG. 23.

The rendered effect processing is performed after the processing in Step S6 of FIG. 8.

Figure 23:
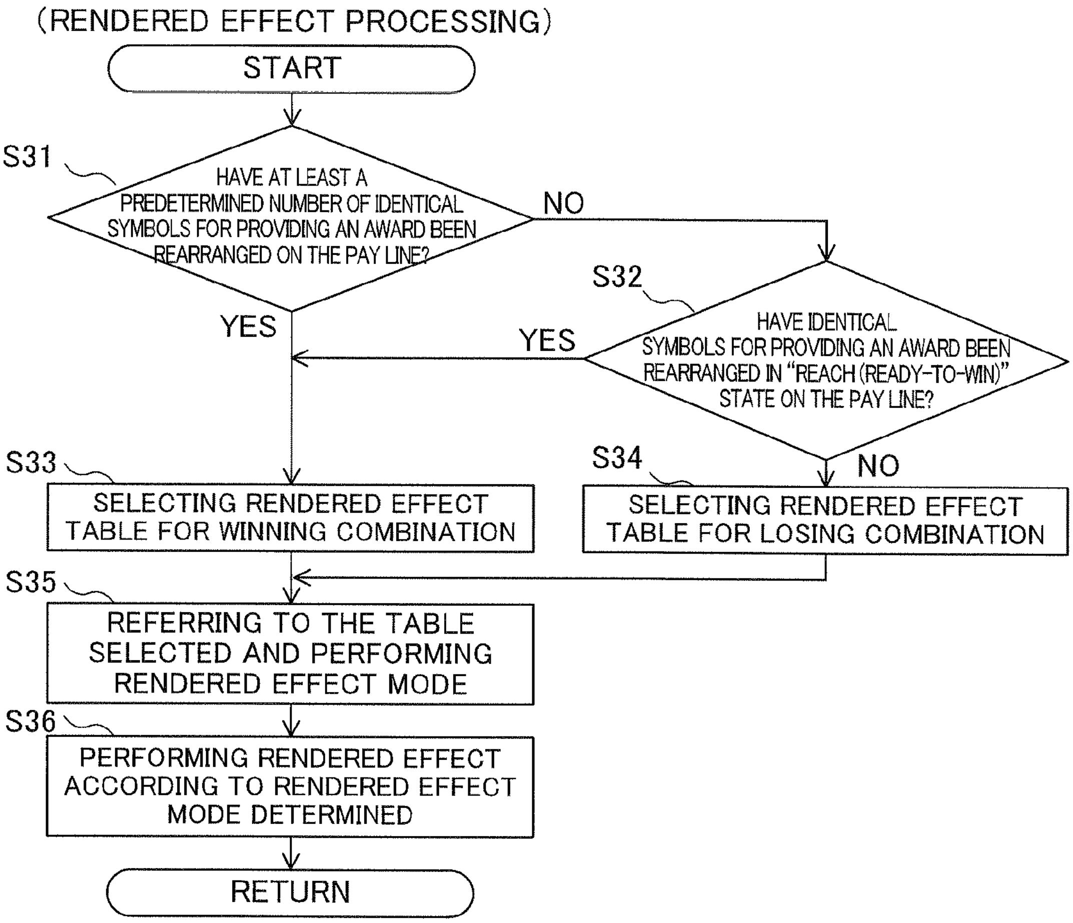
FIG. 23 is a flowchart of rendered effect processing executed in the gaming machine according to an embodiment of the present invention.

Firstly, in Step S31 of the FIG. 23, the CPU 106 determines whether a predetermined number (three) of identical symbols for providing an award is rearranged or not on the pay line L. The identical symbol includes any one of the following symbols: "BONUS", "WILD", "TREASURE BOX", "GOLDED MASK", "HOLY GRAIL", and "COMPASS & MAP". More specifically, it is determined whether three identical symbols for providing an award are rearranged on the pay line L. In the case of a "YES" determination, the processing advances to Step S33. In the case of a "NO" determination, the processing advances to Step S32.

In Step S32, the CPU 106 determines whether identical symbols for providing an award are rearranged in a "REACH" (ready-to win) state. More specifically, the CPU 106 determines whether a symbol rearranged on the pay line L in the symbol group to be rearranged last (symbols in this symbol group are rearranged in the symbol display regions 87 to 89 that correspond to the video reel 3C) is not the identical symbol for providing an award and whether each of a plurality of symbols rearranged on the pay line L in the symbol display groups to be rearranged other than the abovementioned symbol group (symbols in these symbol groups are rearranged in the symbol display regions 81 to 86 that correspond to the video reels 3A and 3B) are the identical symbols for providing an award, among symbols rearranged in the symbol display regions 81 to 89 in the present embodiment. In other words, the CPU 106 determines whether symbols rearranged first and second on the pay line L are identical symbols for providing an award and whether a symbol rearranged last (third) on the pay line L is the identical symbol for providing an award. In the case of a "YES" determination, the processing advances to Step S33. In the case of a "NO" determination, the processing advances to Step S34.

In Step S33, the CPU 106 selects a rendered effect determination table for a winning combination (FIG. 11). Here, the rendered effect determination table for a winning combination is provided to each type of the symbols for providing an award. For example, in a case where the winning combination of "HOLY GRAIL" is determined to be achieved, (or in a case where "HOLY GRAIL" symbols are rearranged in a REACH (ready-to-win) state), the rendered effect determination table for a winning combination that corresponds to the "HOLY GRAIL" is selected. Then, the processing advances to Step S35.

In Step S34, the CPU 106 selects a rendered effect determination table for a losing combination (FIG. 12). Then, the processing advances to Step S35.

In Step S35, the CPU 106 refers to the table selected in Step S33 or Step S34 so as to determine a rendered effect mode. Upon determining a rendered effect mode, the CPU 106 selects a random number in a range of values from 0 to 255 by extracting a random number from the random generator 112 so as to determine a rendered effect mode that corresponds to the random number thus selected.

In Step S36, the CPU 106 starts to perform rendered effect in the rendered effect mode thus determined. Afterwards, the processing advances to Step S8 of FIG. 8.

Accordingly, in a case where a combination with a "REACH" state is achieved, even if it results a losing combination, a rendered effect, which is the same as that performed when a winning combination is achieved, is performed to enable maintaining of the feeling of suspense for winning to the end. On the other hand, in a case where a combination with a "REACH" state is not formed, a rendered effect dedicated to a losing combination is performed, thereby preventing the player from having the feeling of suspense for winning. Consequently, the present invention provides a gaming machine with new entertainment properties which performs rendered effects that enables the feeling of suspense for winning to be sustained according to a symbol combination rearranged upon a losing result.

Furthermore, in the present modified example, although an example applied to a video reel slot machine is explained regarding the present invention, the present invention is not limited thereto and, for example, the present invention may be applied to a mechanical reel slot machine.

Moreover, in the present modified example, although the rotation of the video reels 3A, 3B, and 3C are stopped in this order in the present embodiment, the present invention is not limited thereto, and the rotation of these reels may be stopped in another order such as in the order of 3B, 3C, 3A.

In addition, although rendered effects are performed after starting rotation of the video reels 3A to 3C in the present modified example, the present invention is not limited thereto, and the rendered effects may be performed before starting rotation of the video reels 3A to 3C after symbols to be rearranged on the pay line L are determined.

What is claimed is:

1. A gaming machine comprising:

a display device including a plurality of symbol display regions for displaying each of a plurality of symbol groups;

an input device for starting a game; and a controller for executing the following processing of:

(a) in response to an input to the input device, starting the game and determining symbols to be rearranged in the plurality of symbol display regions;

(b) variably displaying each of the plurality of symbol groups in the plurality of symbol display regions;

(c) among the symbols determined in the processing of (a), determining whether a first predetermined number of identical symbols which corresponds to a winning combination for providing an award is rearranged;

(d) upon determining that the first predetermined number of the identical symbols are rearranged in the processing of (c), displaying a first rendered effect corresponding to the identical symbol on the display device;

(e) upon determining that the first predetermined number of the identical symbols are not rearranged and the symbols determined in the processing of (a) corresponds to a losing combination for providing no award, determining the symbols determined in the processing of (a) satisfy a predetermined condition;

(f) upon determining that the symbols determined in the processing of (a) satisfy the predetermined condition in the processing of (e), displaying a second rendered effect on the display device, wherein the second rendered effect is different from an effect displayed when the symbols determined in the processing of (a) do not satisfy the predetermined condition in the processing of (e);

(g) rearranging each of the plurality of symbol groups in the plurality of symbol display regions; and (h) in a case where the first predetermined number of the identical symbols are rearranged in the plurality of symbol display regions, providing an award corresponding to the identical symbols.

2. The gaming machine according to claim 1, wherein the controller executes the following processing of:

changing the first rendered effect to a message for indicating the winning combination after displaying the first rendered effect on the display device.

3. The gaming machine according to claim 1, wherein the controller executes the following processing of:

changing the second rendered effect to a message for indicating the losing combination after displaying the second rendered effect on the display device.

4. The gaming machine according to claim 1, wherein it is determined that the symbols determined in the processing of (a) satisfy the predetermined condition when a second predetermined number of the identical symbols which corresponds to the losing combination are arranged in the processing of (c) and the identical symbol is included in each of the symbol groups to be rearranged other than the symbol group to be rearranged last and not in the symbol group to be rearranged last among the plurality of symbol groups.

5. The gaming machine according to claim 4, wherein the second rendered effect corresponds to the identical symbol.

6. The gaming machine according to claim 5, wherein the second rendered effect is the same as the first rendered effect.

7. The gaming machine according to claim 5, wherein the controller executes the following processing of:

in the processing of (d), determining a single rendered effect image among a plurality of rendered effect images corresponding to the identical symbol and displaying the rendered effect image thus determined on the display device; and in the processing of (f), determining a single rendered effect image among a plurality of rendered effect images corresponding to the identical symbol, and displaying the rendered effect image thus determined on the display device.

* * * * *